US 10,041,814 B2

(12) United States Patent
Wang

(10) Patent No.: US 10,041,814 B2
(45) Date of Patent: Aug. 7, 2018

(54) OPTICAL MEASUREMENT SYSTEM, METHOD AND SCALEPLATE THEREFOR

(71) Applicant: Yong Wang, Toa Payoh (SG)

(72) Inventor: Yong Wang, Toa Payoh (SG)

( * ) Notice: Subject to any disclaimer, the term of this patent is extended or adjusted under 35 U.S.C. 154(b) by 114 days.

(21) Appl. No.: 14/784,976

(22) PCT Filed: Sep. 10, 2013

(86) PCT No.: PCT/SG2013/000395
§ 371 (c)(1),
(2) Date: Oct. 16, 2015

(87) PCT Pub. No.: WO2014/058390
PCT Pub. Date: Apr. 17, 2014

(65) Prior Publication Data
US 2016/0178406 A1 Jun. 23, 2016

(51) Int. Cl.
*G01D 5/34* (2006.01)
*G01D 5/347* (2006.01)
*G01C 15/06* (2006.01)
(52) U.S. Cl.
CPC ......... *G01D 5/34707* (2013.01); *G01C 15/06* (2013.01); *G01D 5/34776* (2013.01)
(58) Field of Classification Search
CPC ....... G01D 5/34; G01D 5/347; G01D 5/34707
USPC .................................. 250/216, 221, 231.13
See application file for complete search history.

(56) References Cited

U.S. PATENT DOCUMENTS 5,548,392 A * 8/1996 Ogawa .................... G01B 9/06
356/3.13
2011/0077905 A1 3/2011 Duan

FOREIGN PATENT DOCUMENTS

JP 1986017620 2/1986
JP 1995139942 6/1995
JP 2003091366 A 3/2003

OTHER PUBLICATIONS

International Publication and International Search Report for PCT/SG2013/000395.

* cited by examiner

*Primary Examiner* — Kevin Pyo
(74) *Attorney, Agent, or Firm* — Garcia-Zamor IP Law; Ruy M. Garcia-Zamor

(57) ABSTRACT

Embodiment of the present invention provides various types of optical measurement scaleplates, optical measurement apparatus and method using the optical measurement scaleplates for position measurements. In one embodiment, an optical measurement scaleplate has a substrate and a plurality of marking units each being borne on the substrate at a predetermined position. Each marking unit includes a plurality of optically detectable marking elements. Each of said marking elements has an element value defined a permutation of the element value of each of the marking elements in said marking unit, and each unit value corresponds to a physical quantity. On the substrate there is defined a first direction. The physical quantity includes a first distance between a reference position and said predetermined position along the first direction.

37 Claims, 28 Drawing Sheets

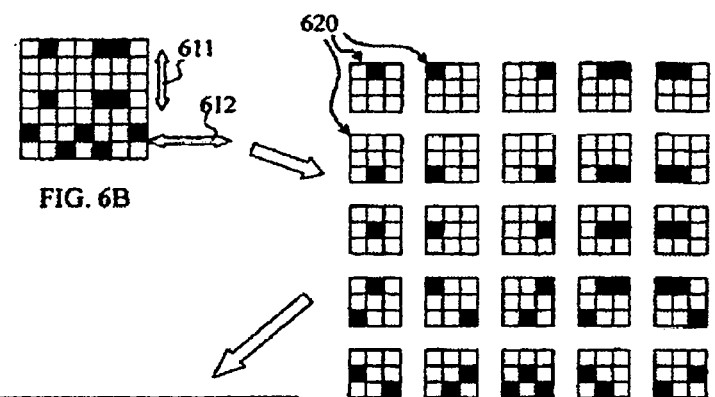

| 0 | 0 | 1 |
|---|---|---|
| 1 | 0 | 1 |
| 0 | 0 | 0 |

FIG. 7D

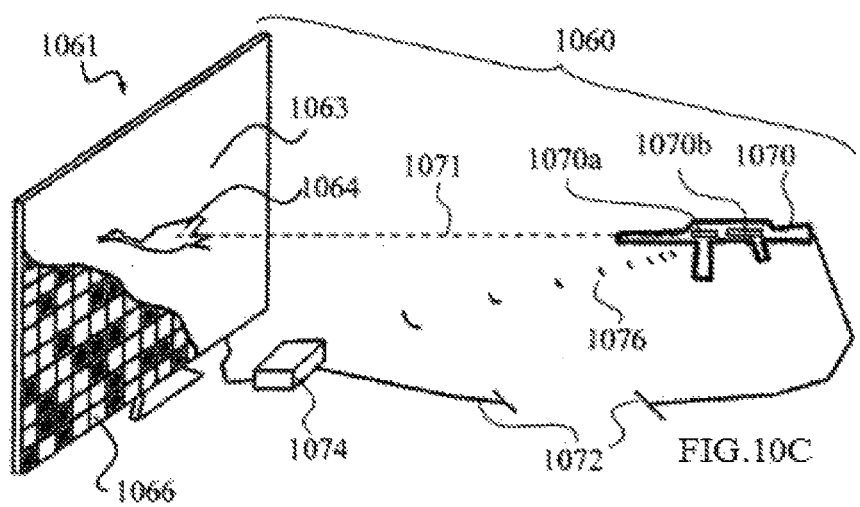
FIG. 10C
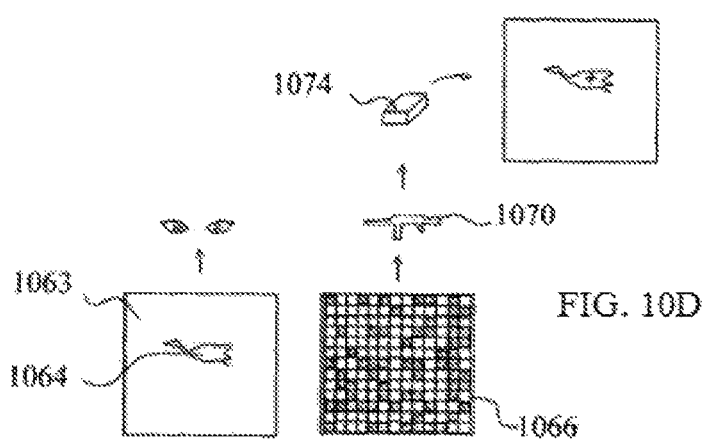
FIG. 10D
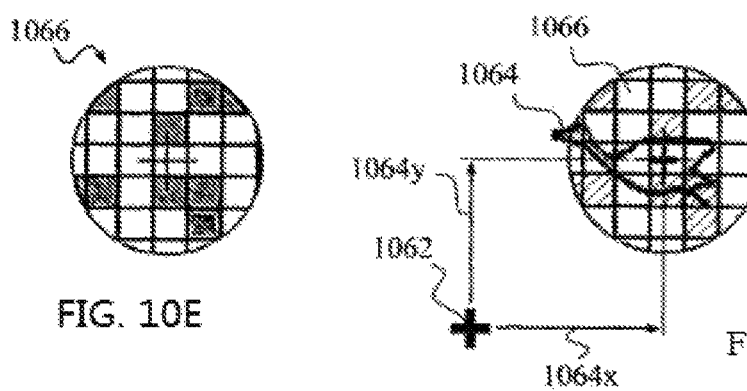
FIG. 10E
FIG. 10F

OPTICAL MEASUREMENT SYSTEM, METHOD AND SCALEPLATE THEREFOR

TECHNICAL FIELD

The present invention relates to optical measurement technology and particularly to an optical measurement scaleplate, an optical measurement apparatus and method using the optical measurement scaleplate.

BACKGROUND

Optical measurement technology are used in industrial applications for measurement of physical quantity e.g. height and distance of an object. Taking land surveying as an example, levelling rods are formed thereon with barcodes for automatic detection by a surveying equipment to determine the height of a position at which the levelling rod is set. To enable automatic reading and to ensure measurement accuracy, the physical dimension of each barcode element, e.g. the width of the bars and the spaces therebetween must be correctly detected and measured by the surveying equipment. Measurement accuracy is therefore limited to either the barcode width precision level and/or the optic elements used in the surveying equipment.

It is therefore desirable to provide an optical measurement scaleplate as well as a measurement method and system using such scaleplate which may be used in land surveying and other related measurement applications to provide accurate and reliable measurement result.

SUMMARY OF INVENTION

Embodiment of the present invention provides various types of optical measurement scaleplates, optical measurement apparatus and method using the optical measurement scaleplates for position measurements. In one embodiment, an optical measurement scaleplate has a substrate and a plurality of marking units each being borne on the substrate at a predetermined position. Each marking unit includes a plurality of optically detectable marking elements. Each of said marking elements has an element value defined by an optical property thereof, and each marking unit has a unit value determined by a permutation of the element value of each of the marking elements in said marking unit, and each unit value corresponds to a physical quantity. On the substrate there is defined a first direction. The physical quantity includes a first distance between a reference position and said predetermined position along the first direction.

In an optical measurement method, scaleplate according to one embodiment of the present invention is positioned in front of an imaging apparatus. An optical image of a first marking unit on the scaleplate is captured, and an element value of each marking element in said first marking unit is determined, based on the optical property of said marking element. Based on a permutation of the element value of the plurality of marking elements in said first marking unit, a first unit value is determined. A first physical quantity is determined by matching the first unit value in a comparison. The first physical quantity includes a first distance between the reference position and said predetermined position along the first direction on the substrate.

An optical measurement system includes an imaging apparatus and a scaleplate according to one embodiment of the present invention. The imaging apparatus includes an optical signal receiver and a processor coupled to the optical signal receiver. The optical signal receiver captures an optical image of the scaleplate, and the processor receives the optical image to determine the element value of each marking element in the optical image, based on the optical property of each marking element. The processor further determines the unit value of the marking unit based on a permutation of the element values. The unit value is matched with a corresponding physical quantity in a comparison table provided in the imaging apparatus. The physical quantity includes a first distance between the reference position and said predetermined position along the first direction.

Other aspects and advantages of the present invention will become apparent from the following detailed description, illustrating by way of example the inventive concept of the present invention.

BRIEF DESCRIPTION OF DRAWINGS

These and other aspects of the present invention will be described in detail with reference to the accompanying drawings, in which:

FIG. 6B is an enlarged partial view of FIG. 6A showing a group of sample marking units.

FIG. 6C is a diagram showing individual marking units detectable from the group of sample marking units of FIG. 6B.

FIG. 6D is a chart showing corresponding unit values of the marking units of FIG. 6C.

FIG. 6E is a chart showing corresponding coordinates of the marking units of FIG. 6C.

FIG. 7D is a chart showing the element value of the marking elements show in FIG. 7C.

FIG. 8B is a partial enlarged view of FIG. 8A.

FIG. 10C is a diagram showing an optical measurement system using a scaleplate according to a further application example of the present invention.

FIG. 10D is a schematic view showing the elements of the optical measurement system of FIG. 10C.

FIG. 10E is a partial enlarged view of FIG. 10D showing a scaleplate image.

FIG. 10F is a partial enlarged view of FIG. 10E showing a scaleplate superimposed with a visual target.

DETAILED DESCRIPTION OF PREFERRED EMBODIMENTS

In the following description, numerous specific details are set forth in order to provide a thorough understanding of various illustrative embodiments of the invention. It will be understood, however, to one skilled in the art, that embodiments of the invention may be practiced without some or all of these specific details. In other instances, well known process operations have not been described in detail in order not to unnecessarily obscure pertinent aspects of embodiments being described.

Figure 1A:
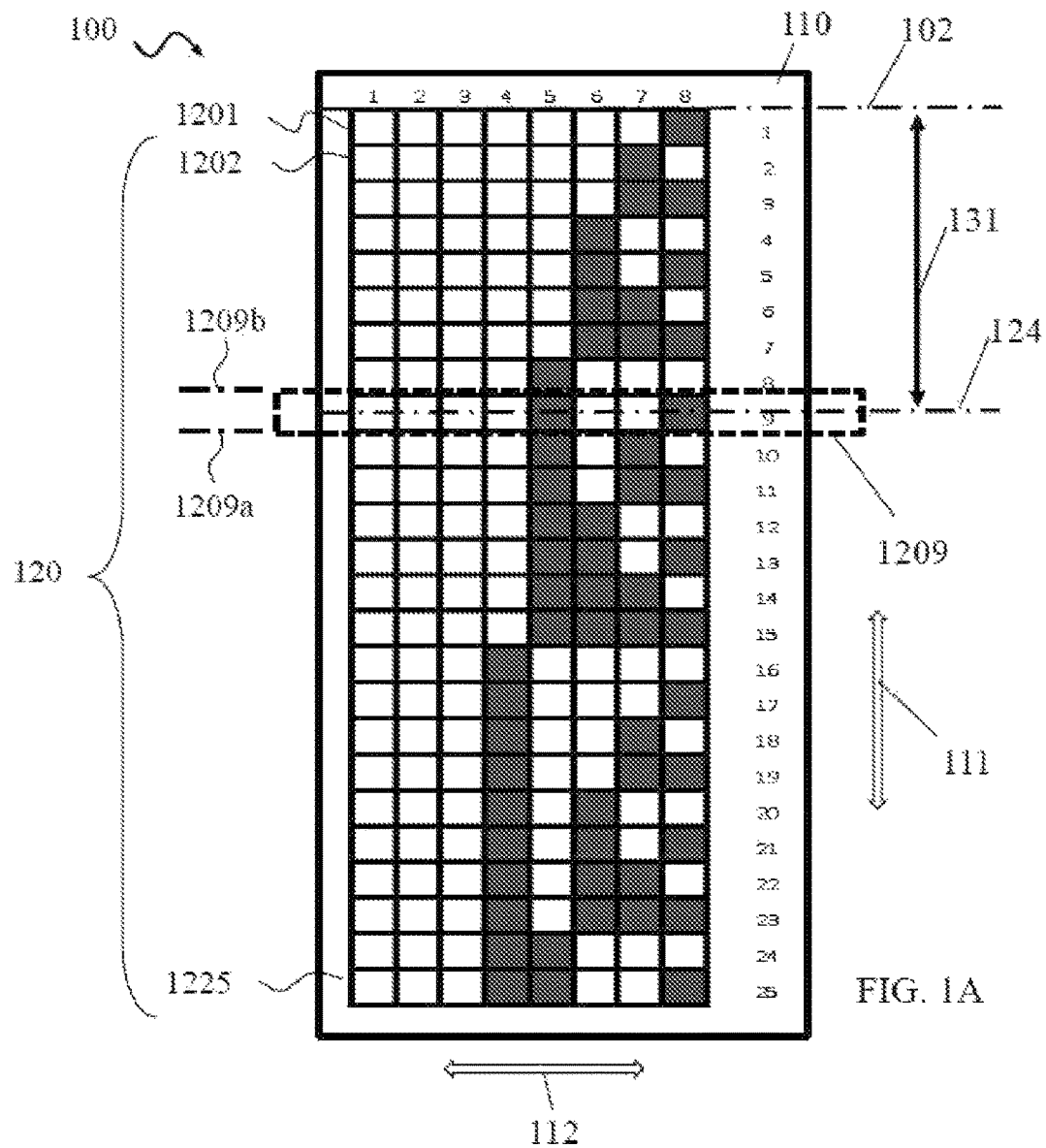
FIG. 1A is a diagram showing a scaleplate according to a first embodiment of the present invention.

FIG. 1A is a diagram showing a scaleplate 100 according to a first embodiment of the present invention. In this embodiment, the scaleplate is configured for linear distance measurement along a specific direction.

With reference to FIG. 1A, scaleplate 100 includes a substrate 110 and a plurality of marking units 120 fixed to substrate 110. Shown in FIG. 1A there are a total of 25 marking units 120 (each being depicted by individual marking unit 1201, 1202, . . . , 1225) for the purpose of illustration. Other numbers of marking units may be used depending on actual needs in different applications.

Substrate 110 has defined thereon a first direction 111 and a second direction 112 across first direction 111, e.g. first and second directions 111 and 112 are perpendicular to each other. Each of the marking units 120 is fixed on a predetermined unique position on the substrate 110. For example, the $9^{th}$ making unit 1209 highlighted by a dashed-line box is fixed on the substrate 110 where the center of the marking unit 1209 is represented by a dash-dotted measurement line 124. Alternatively, measurement line 124 may also be set to coincide with the lower or upper borders 1209a, 1209b defined by marking unit 1209. Marking units 120 may themselves be formed e.g. printed on separate materials such as labels, stickers or the like which do not generate light but reflect light from a light source, and pasted at a corresponding position on substrate 110. Alternatively, marking units 120 may be directly formed on substrate 110 by e.g. engraving, printing etc. Marking units 120 may also be in the form of active light sources e.g. Light Emitting Diode (LED) fixed to substrate. In applications where light sources are used, the lighting status e.g. on/off states as well as brightness, color and/or illumination level of each light source e.g. each LED, is independently controllable.

Figure 1B:
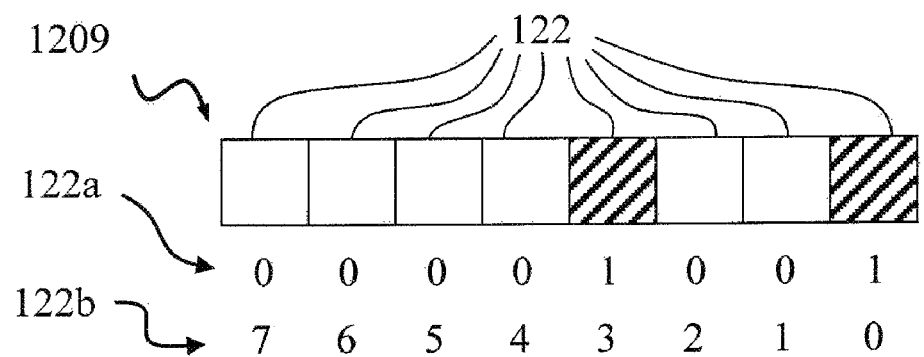
FIG. 1B is an enlarged partial view of FIG. 1A showing a sample marking unit.

In this embodiment, as shown in FIG. 1B, each marking unit e.g. marking unit 1209 comprises 8 marking elements 122 arranged along second direction 112 which intersects first direction 110 by 90 degrees. Each marking element 122 has an element value 122a defined by its optical property, e.g. color, greyscale, pattern or the like. Optionally, an index number 122b may be assigned to each marking element for calculation of unit value based on a permutation of the element value of the marking elements. In the present embodiment, marking elements in dark or black color are assigned with element value of "1"; and those in light or white color are assigned with element value of "0", as indicate in FIG. 1B. Accordingly, the element values are represented in binary numbers. It should be noted, however, that the element value maybe defined by any detectable or visible optical property of the marking element, e.g. color, shape, greyscale, brightness, or any combination thereof of the marking element, hence the element values may also be represented by other digital coding systems. When the optical property is the color or/and brightness, and the color or/and brightness level of the marking element may also be adjusted for easy detection according to actual measurement applications.

Each marking unit 120 has a unit value which is defined by a permutation of the element value of each marking element 122. In situations where an index number is assigned to each marking element, the unit value may be represented according to a different coding system e.g. in the present embodiment, by a decimal number. For example, the unit value of each marking unit 120 can be determined by the following equation:

$$\text{Unit Value} = \Sigma_{i=1}^{n} EV(i) \times 2^{index(i)} \quad (1)$$

In equation (1), n refers to the number of marking elements 122 in a marking unit 120, EV(i) refers to the element value of the $i^{th}$ marking element in binary number, the index(i) refers to the index number pre-assigned to the $i^{th}$ marking element. For instance, in this embodiment, the index number 122b assigned to each marking element in each marking unit is shown in FIG. 1B. Defined in the above mentioned manner, each marking unit has a unit value which is unique throughout all the marking units fixed to substrate 110. In other words, one marking unit corresponds to a unique unit value.

It should be appreciated that the index number assignment shown in FIG. 1B is one example for illustration purpose only, which does not limit the scope of the invention. Any possible way for index number assignment can be used in the present invention.

The unit value of each marking unit 120 in this embodiment corresponds to the relative linear distance along first direction 111 between the position on substrate 110 at which each marking unit 120 is fixed, as defined by measurement line 124, and a reference position 102. Here, reference position 102 serves as a measurement reference which may be set with respect to substrate 110 at any position e.g. at bottom, top, in the middle, or even outside of substrate 110, etc.

Table 1 shows the correspondence between the element value of the marking elements in each marking unit, the unit value of each marking unit, and the physical quantity corresponding to each marking unit. In the present embodiment, the physical quantity is defined as a distance between reference position 102 and each corresponding position on substrate 110 at which a marking unit is fixed. Take the $9^{th}$ marking unit 1209 shown in FIG. 1A as an example, the element values of the marking elements in marking unit 1209 are respectively 0, 0, 0, 0, 1, 0, 0, 1. Represented by binary number, the unit value is "00001001". Alternatively, the unit value of the $9^{th}$ marking unit 1209 maybe represented by a decimal number for easy reading and determination of the uniqueness, according to the equation (1):

$$(0 \times 2^7 + 0 \times 2^6 + 0 \times 2^5 + 0 \times 2^4 + 1 \times 2^3 + 0 \times 2^2 + 0 \times 2^1 + 1 \times 2^0) = 8 + 1 = 9$$

With reference to FIG. 1A and Table 1, a distance 131 between the position of the $9^{th}$ marking unit 1209 and the reference position 102 can be determined as 9 cm. Here, assuming that the height of each marking element along the direction 111 is 1 cm. It should be noted that the measurement scope of this scaleplate can be increased by increasing the height of each marking element 122 along the direction 111, or increasing the number of marking units 120.

TABLE 1

| Element value | Unit value | Distance (cm) |
|---|---|---|
| 0000 0001 | 1 | 1 |
| 0000 0010 | 2 | 2 |
| ... | ... | ... |
| 0000 1001 | 9 | 9 |
| ... | ... | ... |
| 0001 1001 | 25 | 25 |

During a measurement process using this scaleplate, an optical image of scaleplate 100 is captured according to the position of a target object, then the optical image of scaleplate 100 is processed by a processing system to identify the marking unit corresponding to the position of the target object. Next, the element value of each marking element in the identified marking unit is determined according to the optical property of each marking element. Based on Table 1, the linear distance corresponding to the identified marking unit between reference point 102 and the position on substrate 110 at which the identified marking unit is fixed, can be determined. In the present embodiment, the correspondence between the element values of the marking elements in each marking unit and the physical quantity (the distance value in the present embodiment) shown in Table 1, may be pre-stored in the processing system. The processing system can map the element value to a corresponding physical quantity to generate the measurement result. It is also possible that only the correspondence between the unit value and the physical quantity is stored in the processing system. In such situation, the processing system will calculate the unit value of the marking unit according to the element value of each marking element and the index number assigned to the marking element, before the physical quantity is determined.

Figure 2A:
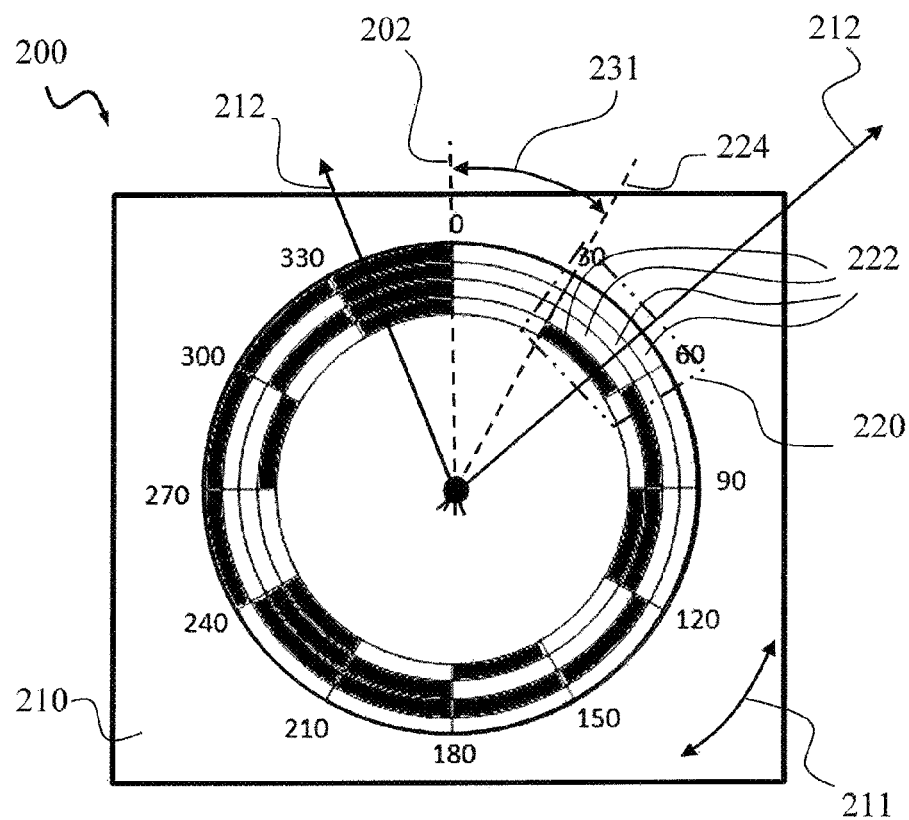
FIG. 2A is a diagram showing a scaleplate according to a second embodiment of the present invention.

FIG. 2A is a diagram showing a scaleplate 200 according to a second embodiment of the present invention. In this embodiment, the scaleplate is configured for measurement of angular distance on a flat surface.

With reference to FIG. 2A, scaleplate 200 comprises 12 marking units 220 fixed on a substrate 210. Each of the marking units 220 is fixed or set on a predetermined position on substrate 210. Taking marking unit 220 highlighted by a dashed line box as an example, for the purpose of measurement operation, a measurement line 224 is defined at the left border of marking unit 220. Alternatively, the measurement line 224 may also be set at the center or the right border of the marking unit 220.

In this embodiment, as shown in FIG. 2A, each marking unit 220 comprises 4 marking elements 222 arranged along a radial direction 212. Each marking element has an element value defined by its optical property. In this embodiment, if the marking element is dark, then its element value is set as "1"; if the marking element is white, then its element value is set as "0".

Figure 2B:
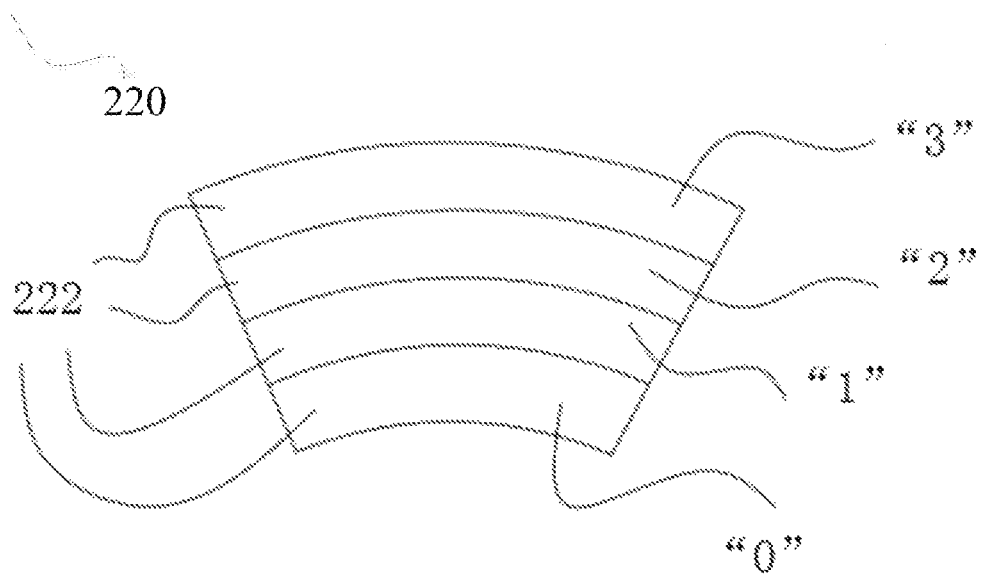
FIG. 2B is an enlarged partial view of FIG. 2A showing a sample marking unit.

Each marking unit 220 has a unit value which is defined by a combination of the element value of each marking element 222 therein. Similar to the previous embodiment, an index number maybe assigned to each marking element 222. For instance, in this embodiment, the index number assigned to each marking element in each marking unit is shown in FIG. 2B, i.e. "0", "1", "2" and "3", respectively. The unit value of each marking unit in decimal format can be determined according to the equation (1).

The unit value of each marking unit 220 in this embodiment corresponds to the relative angular distance 231 along a circumferential direction 211 between the angular position of this marking unit 220 defined by measurement line 224 and reference line 202.

Table 2 shows the correspondence between the element values of the marking elements in each marking unit, the unit value of each marking unit, and the corresponding physical quantity, i.e. the angular distance, according to this embodiment. Take the marking unit 220 highlighted by the dashed line box as an example, the element values of the marking elements therein are respectively 0, 0, 0, 1. Accordingly, the unit value of this marking unit 220 is equal to $(0 \times 2^3 + 0 \times 2^2 + 0 \times 2^1 + 1 \times 2^0) = 1$, and the angular distance between measurement line 224 and the reference line 202 is 30 degree.

TABLE 2

| Element value | Unit value | Angular distance (degree) |
|---|---|---|
| 0000 | 0 | 0 |
| 0001 | 1 | 30 |
| 0010 | 2 | 60 |
| 0011 | 3 | 90 |
| 0100 | 4 | 120 |
| 0101 | 5 | 150 |
| ... | ... | ... |
| 1111 | 15 | 330 |

During a process using this scaleplate for measuring an angular distance, an image of scaleplate 200 is captured at the position of a target object, e.g. the indicator of a dial in a meter, a disk or the like. The image of scaleplate 200 is processed by a processing system to determine the marking unit corresponding to the position of the target object. Next, the element value of each marking element in the identified marking unit is determined according to the optical property of each marking element. The physical quantity corresponding to the identified marking unit can be determined by matching the unit value in the correspondence table shown in Table 2.

It should be noted that the measurement accuracy of this scaleplate can be increased by increasing the number of marking units 220. In addition, the physical quantity corresponding to each marking unit may also be pressure, temperature, force, volume etc., which depends on the application scenarios.

Figure 3A:
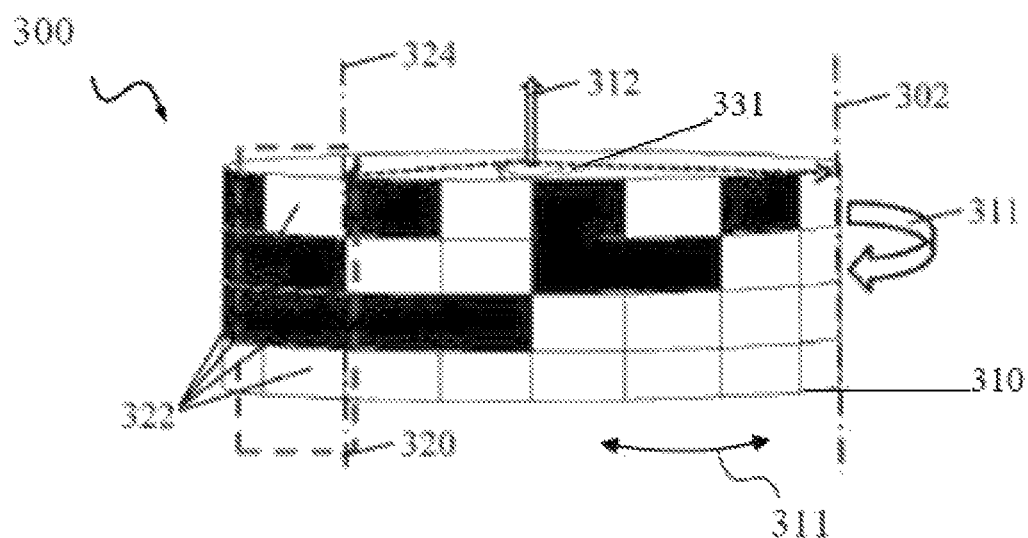
FIG. 3A is a diagram showing a scaleplate according to a third embodiment of the present invention.

FIG. 3A is a diagram showing a scaleplate 300 according to a third embodiment of the present invention. In this embodiment, scaleplate 300 is configured for measurement of angular distance where a substrate has a revolving surface e.g. a cylindrical surface.

Figure 3B:
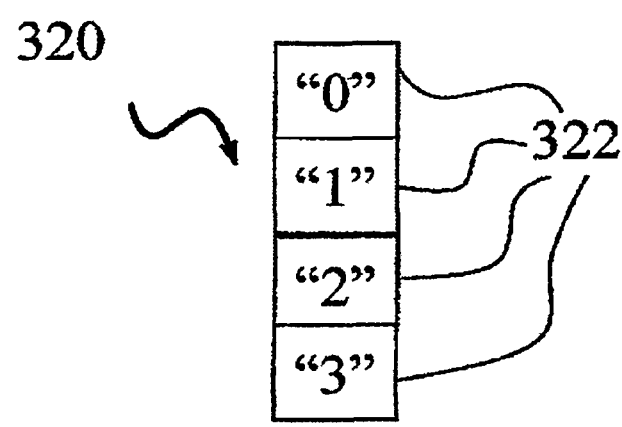
FIG. 3B is an enlarged partial view of FIG. 3A showing a sample marking unit.

With reference FIGS. 3A and 3B, scaleplate 300 includes a substrate 310 and a plurality of marking units 320 fixed on substrate 310. Substrate 310 has a cylindrical surface on which marking units 320 are fixed. Scaleplate 300 is configured to measure the angular distance along a circumferential direction 311 of substrate 310. Scaleplate 300 comprises 16 marking units 320 fixed on a substrate 310. Each of the marking units 320 is fixed or set on a predetermined position on substrate 310, e.g. the making unit 320 highlighted by a dashed line box is set on the substrate 310 and a measurement line 124 is defined at the right border of marking unit 320.

In this embodiment, each marking unit 320 comprises 4 marking elements 322 arranged along an axial direction 312, each marking element has an element value defined by its optical property, specifically, in this embodiment, if the marking element is dark, then its element value is set as "1"; if the marking element is white, then its element value is set as "0".

Each marking unit 320 has a unit value which is defined by a permutation of the element value of each marking element 322 therein. An index number maybe assigned to each marking element. For instance, in this embodiment, the index number assigned to each marking element in each marking unit is shown in FIG. 3B. The unit value in decimal format of each marking unit can be determined according to the equation (1).

The unit value of each marking unit 320 in this embodiment corresponds to the relative angular distance along circumferential direction 311, between the angular position of this marking unit 320 defined by measurement line 324 and reference position 302.

Table 3 shows the correspondence between the element values of the marking elements in each marking unit, the unit value of each marking unit, and the corresponding physical quantity i.e. the angular distance according to this embodiment. Take marking unit 320 highlighted by the dashed line box as an example, the element values of the marking elements in the marking unit 320 are respectively 0, 1, 1, 0. Accordingly, the unit value of this marking unit 320, in decimal format, is 6. According to Table 3, the angular distance between the position of marking unit 320 defined by measurement line 324 and reference position 302 is 135 degree.

TABLE 3

| Element value | Unit value | Angular distance (degree) |
|---|---|---|
| 0000 | 0 | 0 |
| 0001 | 1 | 22.5 |
| 0010 | 2 | 45 |
| 0011 | 3 | 67.5 |
| 0100 | 4 | 90 |
| 0101 | 5 | 112.5 |
| 0110 | 6 | 135 |
| 0111 | 7 | 157.5 |
| 1000 | 8 | 180 |
| 1001 | 9 | 202.5 |
| 1010 | 10 | 225 |
| 1011 | 11 | 247.5 |
| 1100 | 12 | 270 |
| 1101 | 13 | 292.5 |
| 1110 | 14 | 315 |
| 1111 | 15 | 337.5 |

During a process using this scaleplate for measurement of an angular distance, an image of scaleplate 300 is captured according to the position of a target object. The image of scaleplate 300 is processed by a measurement system to identify the marking unit corresponding to the position of the target object. Next, the element value of each marking element in the identified marking unit is determined according to the optical property of each marking element. The angular distance corresponding to the identified marking unit can be determined according to the correspondence shown in Table 3.

In the previously-illustrated embodiments, the scaleplate is configured to measure a physical quantity e.g. a distance along one direction, e.g. a first direction 111, 211 and 311. The marking elements of each marking unit are arranged along a corresponding alignment row parallel to a second direction e.g. 112, 212, 312, across first direction first direction 111, 211 and 311. Each marking unit on the scaleplate has a unit value which is different from the unit values of other marking units of the scaleplate. That is to say, each marking unit has a unique permutation of marking elements contained therein.

In further embodiments, as will be illustrated in detail hereinafter, each marking unit in a scaleplate comprises a plurality of marking elements arranged in an "M×N" matrix, where both M and N are positive integers not less than 1 and the sum of M and N is greater than 2. Each marking element has an element value defined by its optical property, e.g. colour, shape, greyscale or brightness, or any combination thereof etc. For instance, a dark or filled marking element has a value "1", and a light or blank marking element has a value "0". M is defined as the number of marking elements in each row along a second direction, and N is defined the number of marking elements in each column along a first direction. The first direction and the second direction are perpendicular to each other.

Each marking unit has permutation of marking elements therein, i.e. there is no duplicate in the marking units on the scaleplate, so each making unit represents a unique physical position on the scaleplate. The adjacent marking units are arranged to overlap by "M−1" columns in the second direction, and "N−1" rows along the first direction.

When using the scaleplate for position/distance measurement, an optical detection element, e.g. an optical sensor, a digital camera or other similar device is used to capture an image of the marking unit corresponding to the position of a target object. The captured image is then transferred to a processing system. The processing system identifies the marking unit corresponding to the position of the target object based on a pre-set benchmark, e.g. if the benchmark is set at the center of the image, the marking unit in which the benchmark falls in is selected as the corresponding marking unit. Alternatively, the benchmark may be set at other position depending on the application, e.g. at a corner or a side of the marking unit.

Based on the captured image and benchmark, the processing system determines the element value of each marking element in the identified marking unit. Next, the unit value of the marking unit is determined according to a combination of the element value of each marking element and optionally an index number assigned to each marking element. The unit value of the identified marking unit can be calculated according to equation (1). Finally, a physical quantity corresponding to the unit value is determined based on a correspondence table pre-stored in the processing system.

A coding scheme for marking units arranged in an M×N matrix may provide a total of $2^{M \times N}$ different marking unit each possessing a unique value determined by a permutation of the element values of the marking element in each marking unit. Therefore, by using the coding scheme explained above, the information capacity of the scaleplate can be increased. For example, in a coding scheme for marking units arranged in a 3×3 matrix, a scaleplate may contain up to 512 unique marking units fixed to a substrate for measurement of respective physical positions.

Figure 4A:
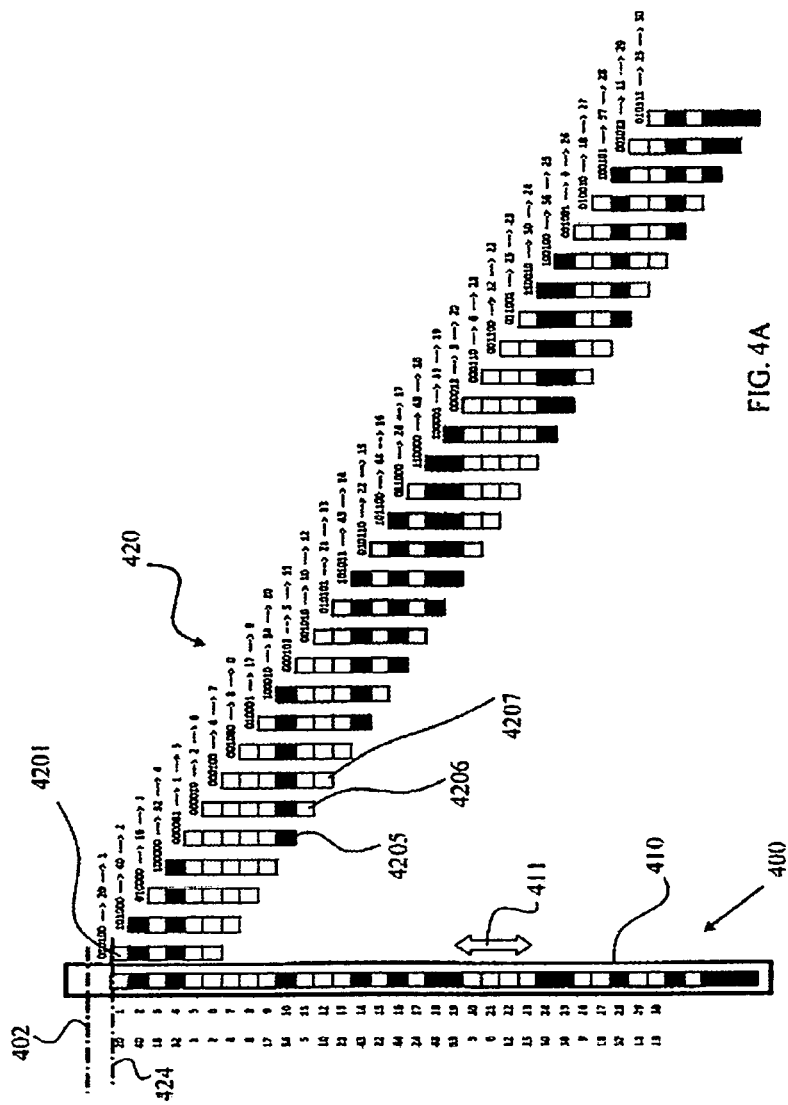
FIG. 4A is a diagram showing a scaleplate according to a fourth embodiment of the present invention.

FIG. 4A is a diagram showing a scaleplate 400 and a coding scheme of using marking units structured in "1×6" matrix, according to a fourth embodiment of the present invention. In this embodiment, scaleplate 400 is configured for linear distance measurement along a specific direction.

As shown in FIG. 4A, scaleplate 400 comprises a substrate 410 and 30 marking units 420 fixed on substrate 410. Defined on substrate 410 there is a first direction 411 along which a physical quantity, e.g. a distance, is to be measured. Each marking unit 420 comprises 6 marking elements 422 arranged in a "1×6" matrix, i.e. the 6 marking elements are arranged in a single column first direction 411. Each marking element has an element value defined by its optical property. In this embodiment, a dark or filled marking element has a value "1", and a light or blank marking element has a value "0".

Each of the marking units 420 is fixed or set at a predetermined position on substrate 410. Each marking unit 420 has a unique permutation of element values and as a whole, each marking unit 420 corresponds to a distinctive position on the substrate 410. The adjacent marking units 420 are arranged to partially overlap with each other, e.g. by 5 rows in first direction 411. Take marking units 4205, 4206 and 4207 as example, the $1^{st}$-$5^{th}$ marking elements of marking unit 4206 overlap with the $2^{nd}$-$6^{th}$ marking elements of marking unit 4205. Likewise, the $2^{nd}$-$6^{th}$ marking elements of marking unit 4206 overlap the $1^{st}$-$5^{th}$ marking elements of marking unit 4207.

Figure 4B:
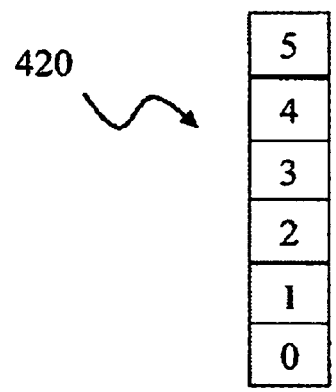
FIG. 4B is an enlarged partial view of FIG. 4A showing a sample marking unit.

FIG. 4A also shows the correspondence between a permutation of binary element values of each marking unit 420, the unit value of each marking unit 420 represented in decimal format, and the assigned physical quantity corresponding to the position of each marking unit. For instance, the $1^{st}$ marking unit 4201 has a permutation of binary element values "010100", which corresponds to a unit value "20" in decimal format, and the unit value "20" corresponds to the physical quantity "1". The unit value can be calculated according to equation (1) based on the index number assigned to each marking element in each marking unit, as shown in FIG. 4B.

The unit value of each marking unit 420 in this embodiment corresponds to a relative linear distance along first direction 411, between a predetermined measurement line 424 and reference position 402. Measurement line 424 can be pre-set at any position with respect to marking unit 420, e.g. the measurement line 424 can be set at the beginning of each marking unit 420, at the lower edge of the first marking element of each marking unit 420, the center of each marking unit 420 or even outside the area covered by each marking unit 420.

During a measurement process, an image of scaleplate 400 is captured and transferred to a processing system. The processing system identifies the marking unit corresponding to the position of a target object based on a pre-set benchmark. Next, the element value of each marking element in the identified marking unit is determined based on its optical property. Thereafter, the unit value of the marking unit is determined based on the element value and the pre-assigned index number of each marking element. Finally, the linear distance value corresponding to the unit value is determined based on the pre-stored correspondence table between these two values in the processing system.

It should be noted that the measurement scope of this scaleplate maybe increased by increasing the height of each marking element 422 along first direction 411, or increasing the number of marking units 420, or both.

Figure 4C:
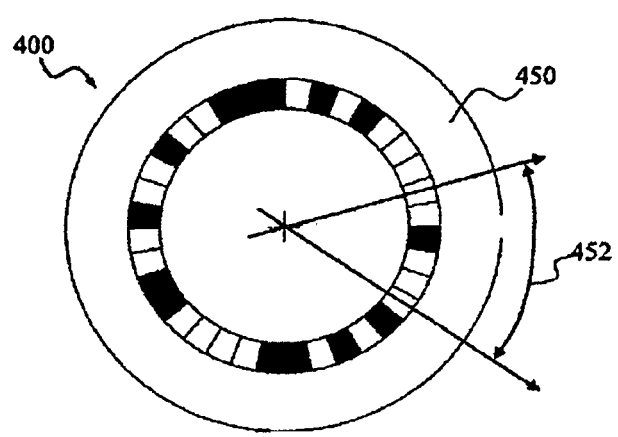
FIG. 4C is a diagram showing a scaleplate having the same marking elements and marking units as that of FIG. 4A and used in a different application.
Figure 4D:
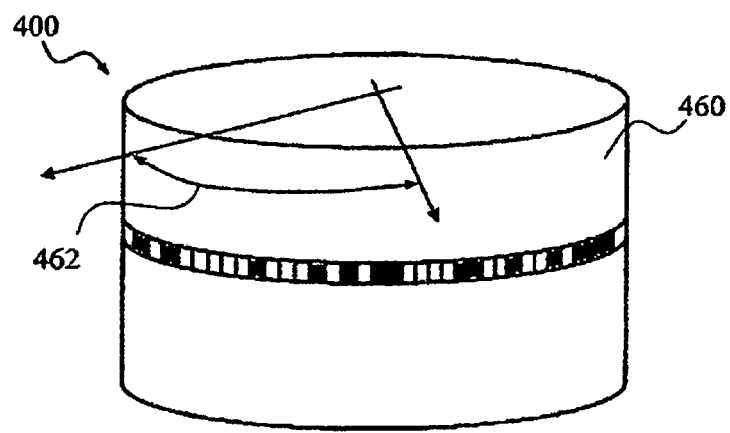
FIG. 4D is a diagram showing a scaleplate having the same marking elements and marking units as that of FIG. 4A and used in another application.

The marking elements of scaleplate 400 may also be arranged along an annular direction on a flat or plane substrate 450, e.g. a disk, for measurement of angular distance 452, as shown in FIG. 4C. Further, the marking elements of scaleplate 400 may also be arranged along an annular direction on a revolving surface, e.g. a cylindrical surface on a substrate 460, for measurement of angular distance 462, as shown in FIG. 4D.

Figure 5A:
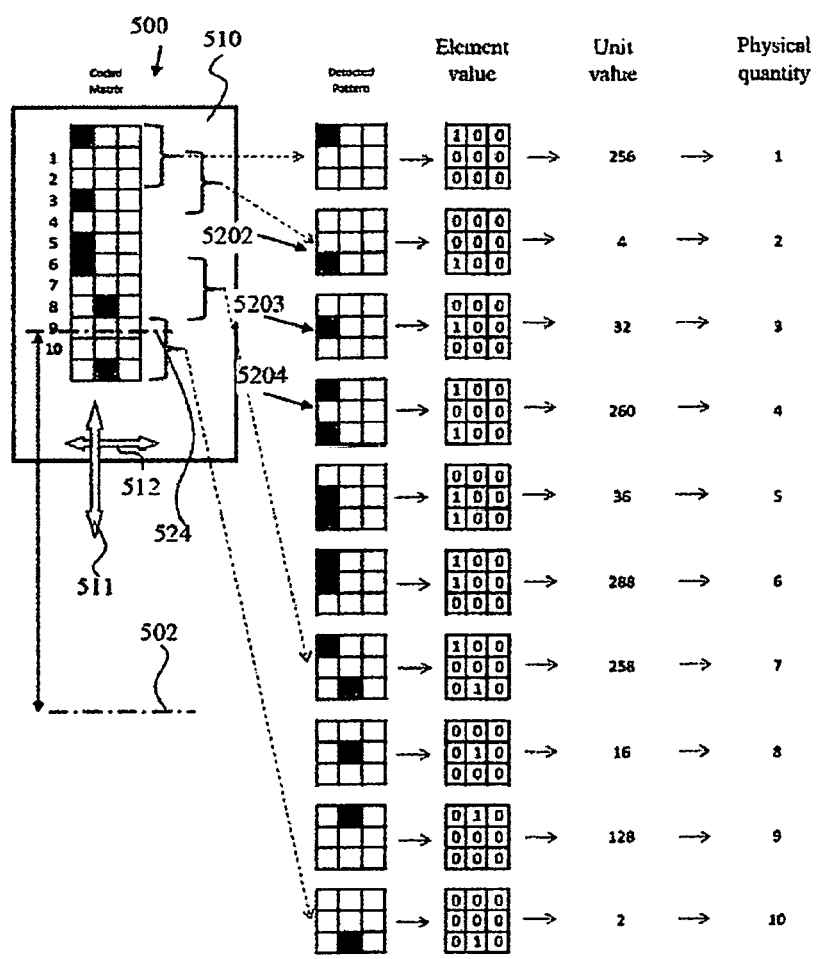
FIG. 5A is a diagram showing a scaleplate according to a fifth embodiment of the present invention.

FIG. 5A is a diagram showing a scaleplate 500 and a coding scheme according to a fifth embodiment of the present invention. As shown in FIG. 5A, scaleplate 500 comprises a substrate 510 and 10 marking units 520 fixed on substrate 510. Each marking unit 520 comprises 9 marking elements 522 arranged in a "3×3" matrix. Each marking element 522 has an element value defined by its optical property. In this embodiment, a dark or filled marking element has a value "1", and a light or blank marking element has a value "0".

Each of the marking units 520 is fixed or set on a predetermined position on substrate 510. Each marking unit 520 has a unique permutation of element values and as a whole, each marking unit corresponds to a distinctive position on scaleplate 500. Adjacent marking units 520 are arranged to overlap by 2 rows along a first direction 511 defined on substrate 510. Take the marking units 5202, 5203 and 5204 as an example, the $1^{st}$ and the $2^{nd}$ rows of marking elements of marking unit 5203 overlap with the $2^{nd}$ and $3^{rd}$ rows of marking elements of marking unit 5202. The $2^{nd}$ and $3^{rd}$ rows of marking elements of the marking unit 5203 overlap with the $1^{st}$ and $2^{nd}$ rows of marking elements of the marking unit 5204.

Figure 5B:
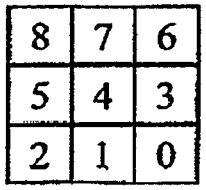
FIG. 5B is an enlarged partial view of FIG. 5A showing a sample marking unit.

FIG. 5A also shows the correspondence between a permutation of binary element values of each marking unit 520, the unit value of each marking unit 520, and the coordinate of physical positions at which each marking unit is fixed. Each marking unit 520 has a unit value which is defined by a permutation of the element value and the pre-assigned index number of each marking element 522 therein. The pre-assigned index number for each marking element 522 in each marking unit 520 is shown in FIG. 5B. The unit value can be calculated according to equation (1). The unit value of each marking unit 520 in this embodiment corresponds to the relative linear distance along first direction 511, between a predetermined measurement line 524 passing through a marking unit 520 and reference position 502, along second direction 512. This measurement line 524 can be pre-set at any position within the marking unit 520, e.g. the measurement line 524 can be set at the beginning of each marking unit 520 or the upper/lower edge of the first row marking elements of each marking unit 520, at the center of each marking unit 520 or even outside of the area covered by each marking unit 520.

Figure 5C:
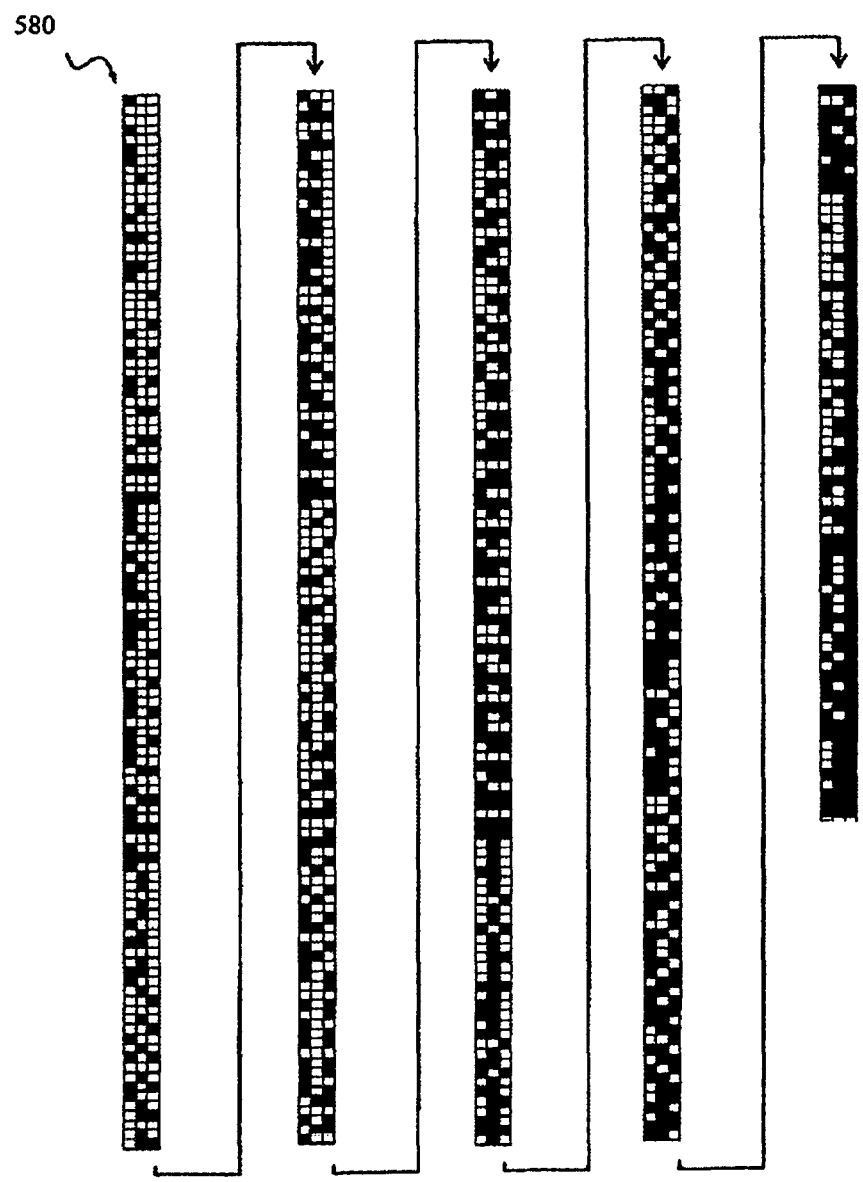
FIG. 5C is a diagram showing a scaleplate of FIG. 5A for use as a levelling rod.

Scaleplate 500 shown in FIG. 5A comprises 10 marking units 520, which may form part of a scaleplate 580 shown in FIG. 5C. Based on the "3×3" matrix structure and coding scheme illustrated above, scaleplate 580 can contain up to 512 different marking units.

Figure 5D:
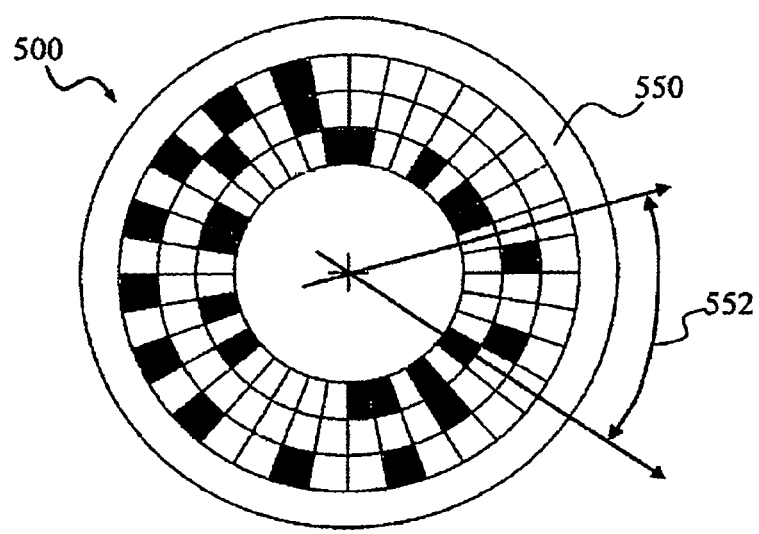
FIG. 5D is a diagram showing a scaleplate having the same marking elements and marking units as that of FIG. 5A and used in a different application.
Figure 5E:
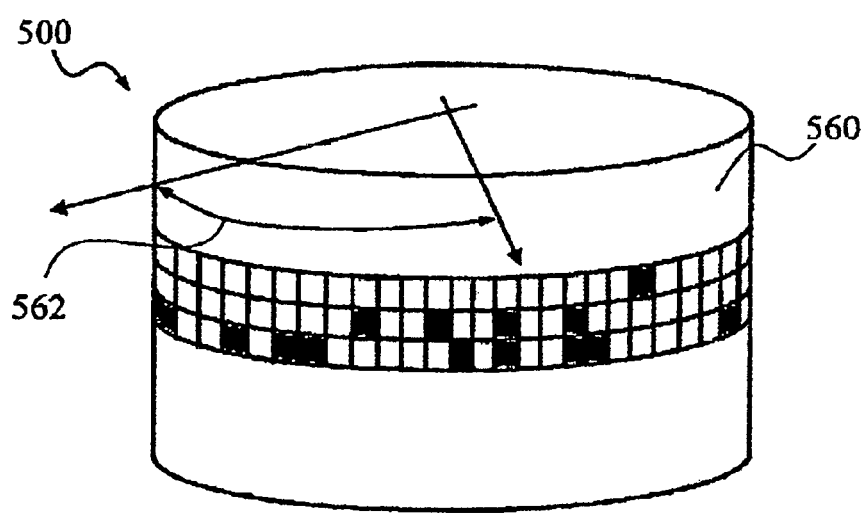
FIG. 5E is a diagram showing a scaleplate having the same marking elements and marking units as that of FIG. 5A and used in another application.

The marking elements of scaleplate 500 may also be arranged along an annular direction on a flat or plane substrate 550, e.g. a disk, for measurement of angular distance 552, as shown in FIG. 5D. Further, the marking elements of scaleplate 500 may also be arranged along an annular direction on a revolving surface, e.g. a cylindrical surface on a substrate 560, for measurement of angular distance 562, as shown in FIG. 5E.

FIGS. 6A to 6M show a scaleplate 600 according to a sixth embodiment of the present invention, which can be used for two dimensional linear distance measurement.

As shown in FIGS. 6A to 6F, scaleplate 600 comprises a plurality of marking units 620 arranged in a 2-dimensional matrix on a substrate 610. Defined on substrate 610 there is a first direction 611 and a second direction 612 perpendicular to first direction 611. Each marking unit 620 comprises 9 marking elements 622 arranged in a "3×3" matrix. Each marking element 622 has an element value defined by its optical property and an index number assigned thereto. In this embodiment, a dark or filled marking element has a value "1", and a light or blank marking element has a value "0".

Each of the marking units 620 is fixed or set on a predetermined position on substrate 610. Each marking unit 620 has a unique unit value defined by a permutation of element values therein and as a whole, each marking unit 620 corresponds to a unique position on substrate 610. Adjacent marking units 620 are arranged to partially overlap with each other, e.g. by 2 rows in first direction 611 and by 2 columns in second direction 612.

Figure 6A:
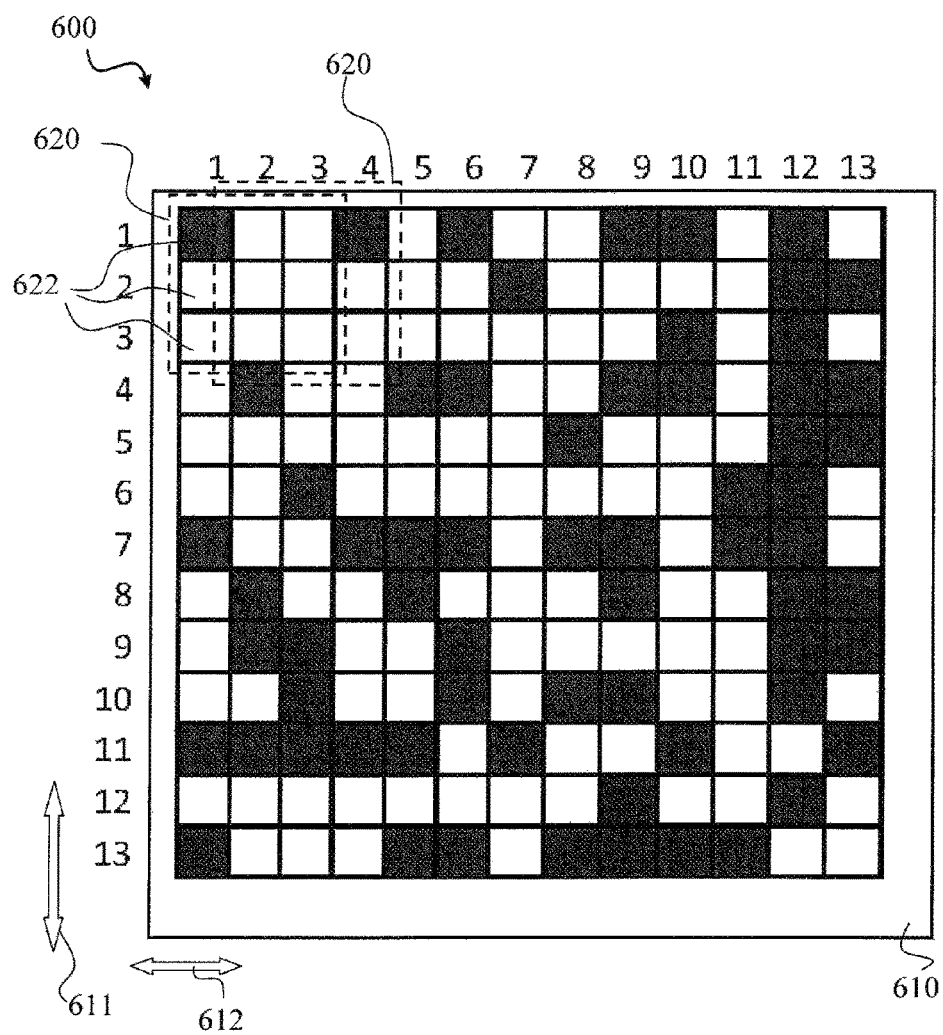
FIG. 6A is a diagram showing a scaleplate according to a sixth embodiment of the present invention.
Figure 6F:
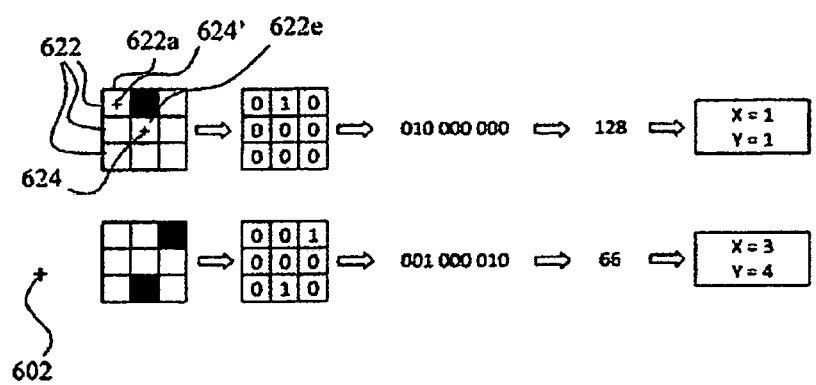
FIG. 6F is a diagram showing sample marking units of FIG. 6C and corresponding unit values.
Figure 6G:
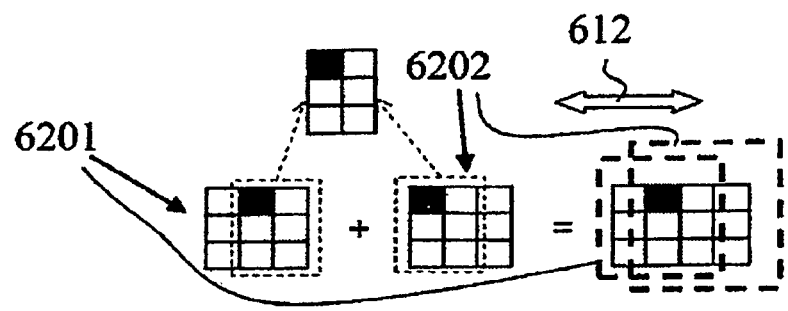
FIG. 6G is a diagram showing two marking units of FIG. 6C when partially overlapped along a second direction.

FIG. 6G illustrates the overlapping structure of adjacent marking units 6201 and 6202 along second direction 612. The $2^{nd}$ and $3^{rd}$ columns of the antecedent marking unit 6201 are configured to be the same as the $1^{st}$ and $2^{nd}$ columns of the subsequent marking unit 6202. Accordingly, on substrate 610, the two duplicated marking element columns are overlapped with each other to form a "4×3" matrix. In other words, this "4×3" matrix includes first marking unit 6201 of a "3×3" matrix and second marking unit 6202 of "3×3" matrix.

Figures 6H, 6I:
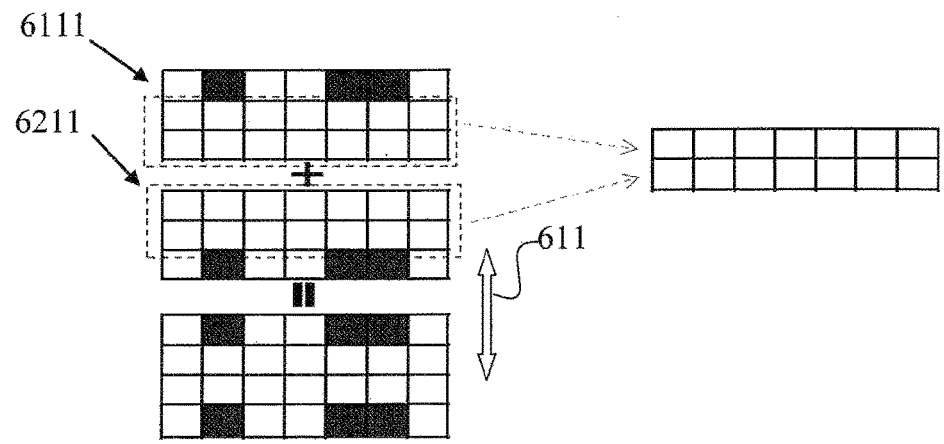
FIG. 6H is a diagram showing five marking units of FIG. 6C which can be partially overlapped with adjacent marking units along a second direction to form a marking group.
FIG. 6I is a diagram showing two marking groups of FIG. 6B which can be partially overlapped along a first direction.
Figure 6J:
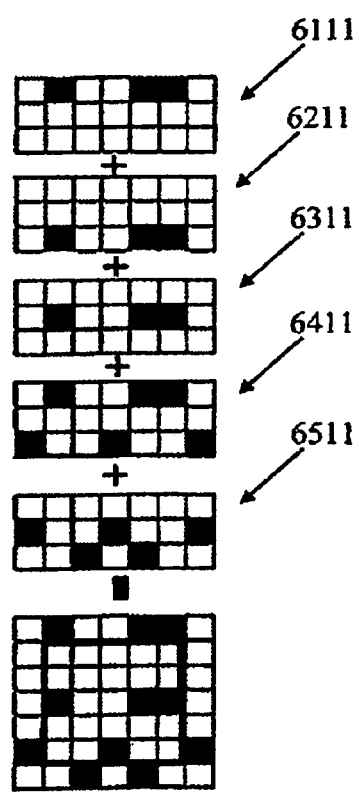
FIG. 6J is a diagram showing five marking groups of FIG. 6B which can be partially overlapped with adjacent marking groups along a first direction.

FIG. 6H shows the overlapping structure of adjacent marking units 6201, 6202, 6203, 6204 and 6205 of each marking unit row, along second direction 612, to form a first marking group 6111. FIG. 6I shows the overlapping structure of adjacent marking groups 6111, 6211, along first direction 611. With adjacent marking units partially overlapped along first direction 611 and 612 in the above-illustrated manner, marking elements in a "7×7" matrix on substrate 610 may provide 25 marking units, each being a complete "3×3" matrix, as shown in FIG. 6J. Each marking unit corresponds to a physical position i.e. in this embodiment, one physical position is represented by a 2-dimensional coordinate and accordingly, the 25 marking units shown in FIG. 6J represents 25 physical positions.

Figures 6K, 6L:
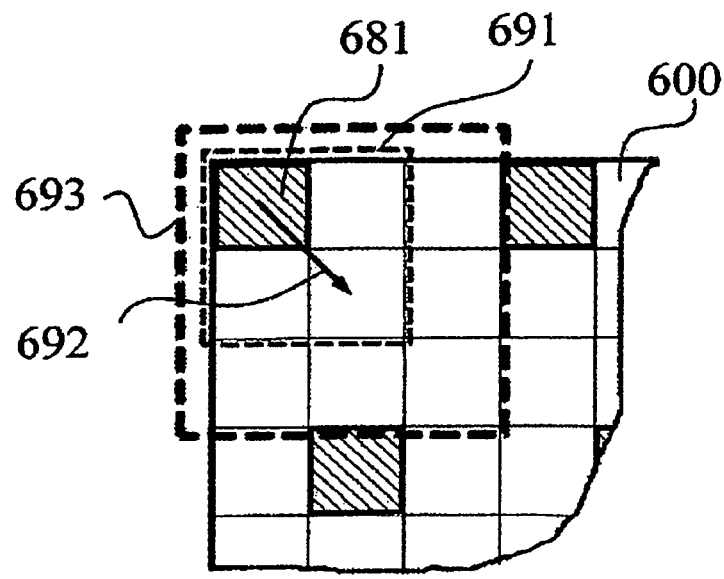
FIG. 6K is a diagram showing a sample marking unit of FIG. 6A.
FIG. 6L is a diagram showing marking units of the scaleplate of FIG. 6A when used to measure a position at a corner portion of the scaleplate.

Each marking unit 620 has a unit value defined by a permutation of element values of each marking element therein. The pre-assigned index number of each marking element in each marking unit according to this embodiment is shown in FIG. 6K. The unit value represented in decimal format is determined based on the element value and the corresponding index number, according to the equation (1). For instance, the binary element value of each marking element in the first marking unit shown in FIG. 6F is respectively "0, 1, 0, 0, 0, 0, 0, 0, 0". The unit value in decimal format of this marking unit is equal to "128", which is configured to correspond to a two dimensional physical position coordinate (x=1, y=1). The two dimensional coordinate represents the relative position between a predetermined measurement point 624 and a reference position 602. This measurement point 624 maybe pre-set at any position within the marking unit 620, e.g. a center marking element 622e of each marking unit 620. Alternatively, measurement point 624 may be pre-set at marking element 622a located at the upper-left corner of each marking unit 620, i.e. measurement point 624' shown in FIG. 6F.

Although in FIGS. 6A and 6J there are shown 25 marking units of "3×3" matrix structure, it should not be understood to limit the scope of the present invention. A scaleplate may comprise other numbers of marking units as long as the requirements for arranging the marking units on the scaleplate are satisfied, i.e. each marking unit has a distinct unit value corresponding to a unique physical quantity, and the adjacent marking units are arranged to overlap by one or more rows/columns, e.g. by "M−1" columns along the second direction, and by "N−1" rows along the first direction. For example, FIG. 6A shows the structure of a scaleplate comprising a 13×13 marking element matrix by which, an 11×11=121 marking units are defined each being a "3×3" matrix structure. Each of these 121 marking units corresponds to a unique position on scaleplate 600.

Figure 6M:
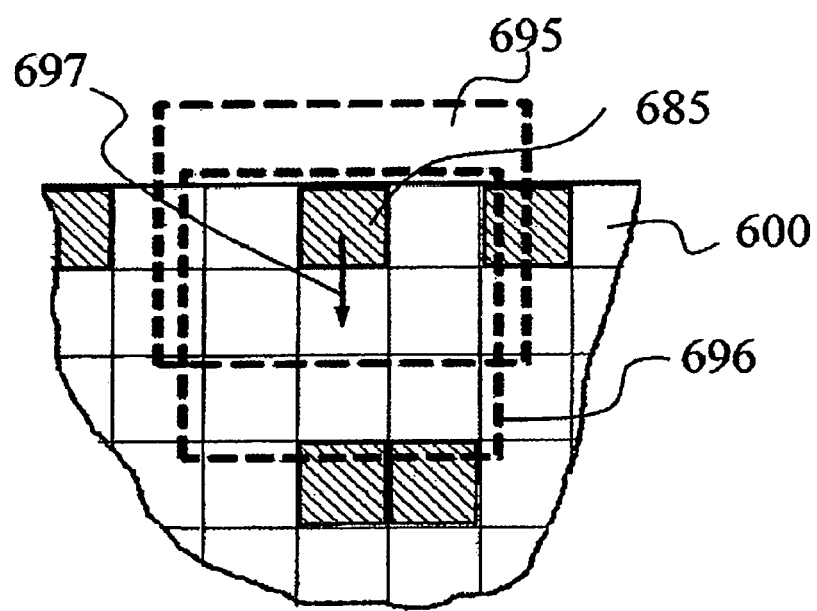
FIG. 6M is a diagram showing marking units of the scaleplate of FIG. 6A when used to measure a position at a border portion of the scaleplate.

In situations where a position to be measured is located at a corner 681 of scaleplate 600, as shown in FIG. 6L, a marking unit 691 corresponding to corner position 681 has a "2×2" matrix structure. The position of corner 681 can be determined by making reference to an adjacent, complete "3×3"-structured marking unit 692 together with a vector 693 representing the relative position between the "2×2" marking unit 691 and the "3×3" marking unit 692. Similarly, as shown in FIG. 6M, when a position to be measured is located at a top or bottom border 685 of scaleplate 600, a marking unit 695 corresponding to this border position has a "3×2" matrix structure (or a "2×3" matrix structure at left or right border). The position of border 685 can be determined by making reference to an adjacent, complete "3×3"-structured marking unit 696 together with a vector 697 representing the relative position between the "3×2" marking unit 695 and the "3×3" marking unit 696. In this way, the full area of scaleplate 600 can be utilized, i.e. a scaleplate comprising an n×n marking element matrix can provide position/distance information of the same number of n×n locations.

Figure 6N:
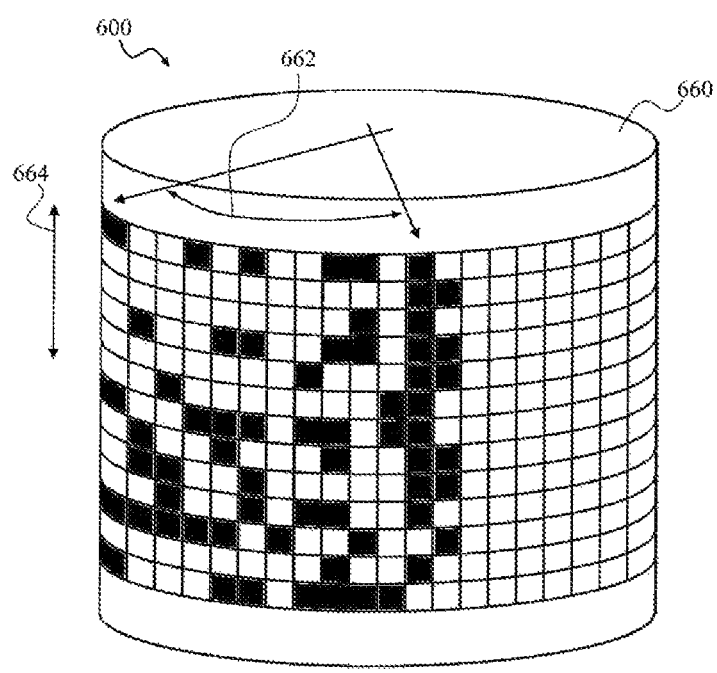
FIG. 6N is a diagram showing a scaleplate having the same marking elements and marking units as that of FIG. 6A and used in a different application.

The marking elements of scaleplate 600 may also be arranged along an annular direction on a revolving surface, e.g. a cylindrical surface on a substrate 660, for measurement of angular distance 662 and an axial distance 664, as shown in FIG. 6N.

In the above embodiments, the constitution of a scaleplate according to the present invention has been explained. Various application examples will be described below to further illustrate the usages of the scaleplates for measurement according to embodiments of the present invention.

Application Example 1

FIGS. 7A to 7D show an auto levelling system in which, a scaleplate is used as a levelling rod for height measurement. Auto levelling system 700 comprises a levelling rod 710 and a levelling system 750. A scaleplate similar to those shown in FIG. 5A is used as levelling rod 710, which comprises a plurality of marking units 720 each being structured in a "3×3" matrix of marking elements. Each marking unit has a distinctive unit value defined by a permutation of the element value and a pre-assigned index number of each marking element therein. Adjacent marking units are arranged to overlap by 2 rows in the vertical direction 711. Each unit value corresponds to a height value h measured between a predetermined measurement line 724 and a reference point 702. In the present example, measurement line 724 is configured to pass through center point of each marking unit 720.

To carry out the height measurement, levelling rod 710 is erected vertically at a measurement point 701 selected for height measurement. Levelling system 750 is set up a distance away from levelling rod 710, and with imaging devices e.g. a camera 752 facing levelling rod 710, aiming along horizontal sight line 754.

An optical image of levelling rod 710 is then captured by which the marking elements on levelling rod 710 at horizontal sight line 754 are detected and the element value of each elements are determined, based on the optical property of each marking element. A permutation of these element values is obtained which represents the unit value of a marking unit at which horizontal sight line 742 is collimated. By locating the unit value in a comparison table stored in levelling system 750, a height data is obtained matching the unit value, which represents the actual height information of measurement point 701.

Figure 7A:
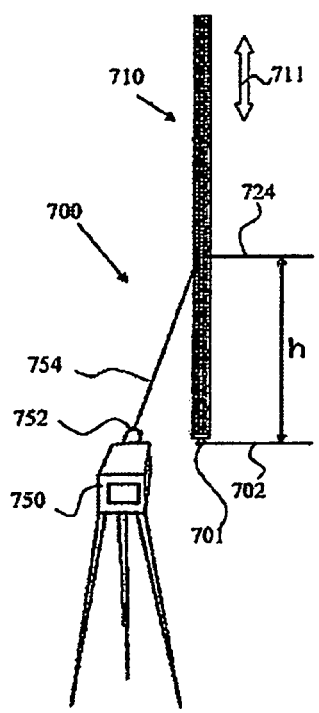
FIG. 7A is a diagram showing an optical measurement system using a scaleplate according to one application example of the present invention.
Figure 7B:
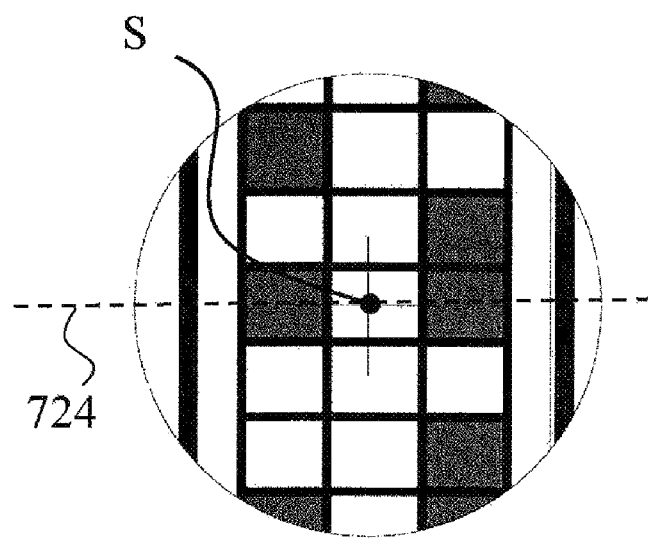
FIG. 7B is an enlarged diagram showing a portion of the scaleplate of FIG. 7A.
Figure 7C:
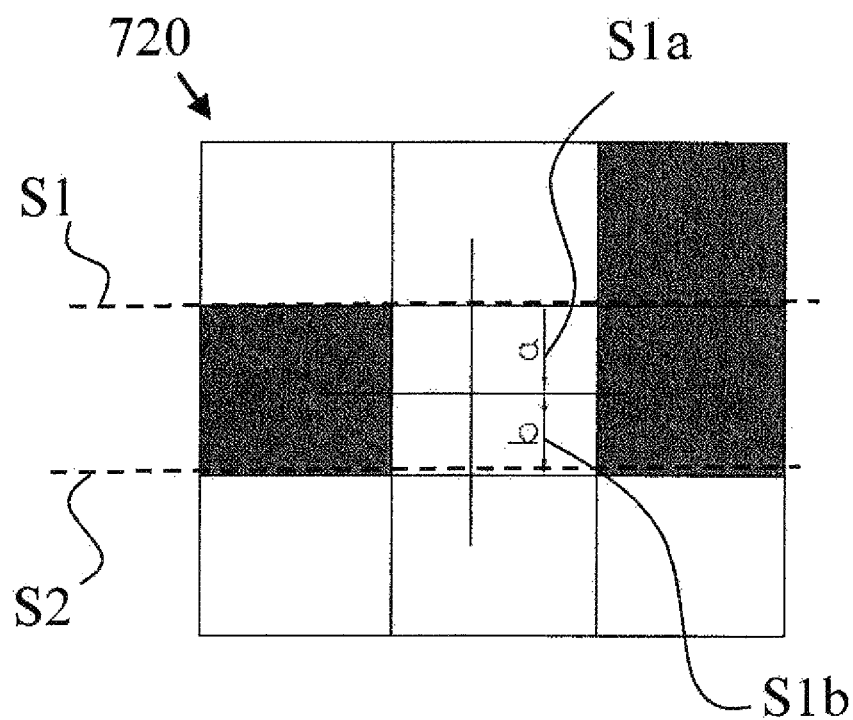
FIG. 7C is a further enlarged view of FIG. 7B.
Figure 7D:
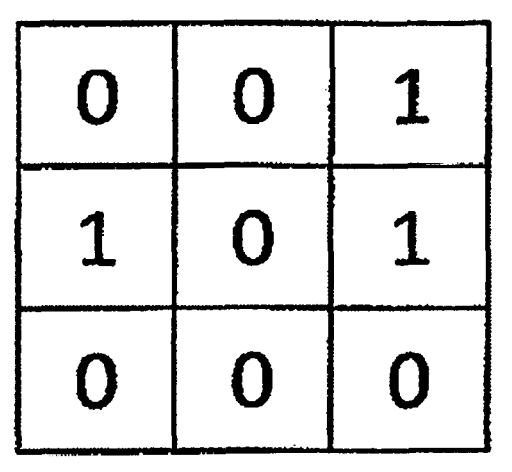

FIG. 7B shows an example of an image captured by electronic levelling system 750. The sighting point S is indicated at the center of the image through which measurement line 724 is defined. The marking unit corresponding to the position of the target object is selected according to the sighting point S, which is shown in FIG. 7C. According to the optical property of each marking element in marking unit 720, the element value of each marking element is determined, as shown in FIG. 7D. The unit value of the selected marking unit can therefore be determined based on a permutation of the element value and pre-assigned index number of each marking element therein.

The unit value of this identified marking unit is "104" in decimal format. Based on this calculated unit value and the pre-stored table in electronic levelling system 750, the corresponding height value h is obtained.

Assuming that the height value obtained is "47", then depending on the size of the marking elements, this value may be interpreted as different measurement results. For example, when each marking element has a height of 5 cm, the actual height will be 47×5=235 cm.

To obtain the measurement results with an increased accuracy level, a second reading may be performed according to the actual position of measurement line 724 between the upper border S1 of the corresponding marking element/marking unit, and the lower border S2 of the corresponding marking element/marking unit.

For instance, as shown in FIG. 7C, assuming that the distance from measurement line 724 to lower border is S2b=43% of the total distance between S1 and S2, the actual height of the target object can be determined as 47×5+0.43×5=237.15 cm.

It should be appreciated by a person skilled in the art that the measurement method involving first reading and second reading illustrated above can be used in all the embodiments disclosed in the contexts to achieve a high level of measurement accuracy.

Application Example 2

Figure 8A:
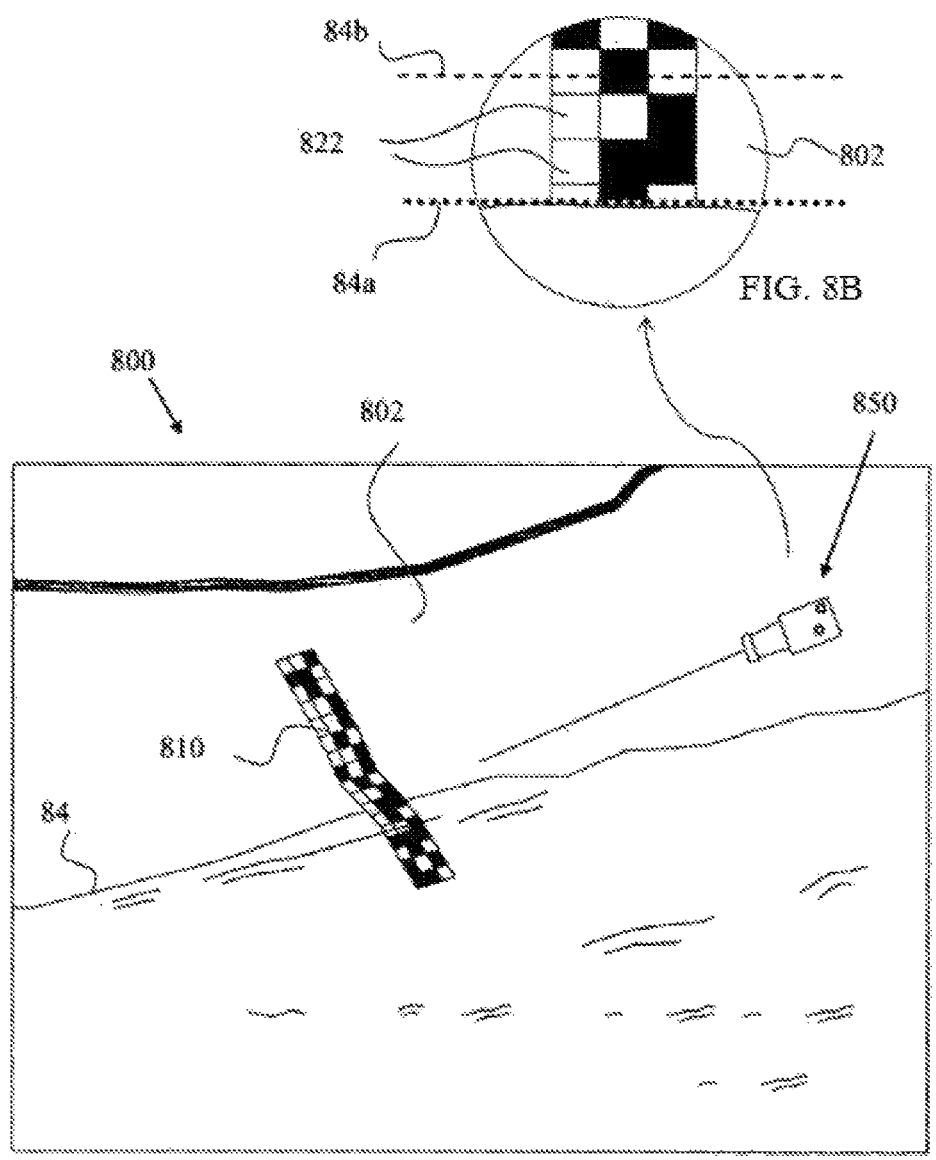
FIG. 8A is a diagram showing an optical measurement system using a scaleplate according to another application example of the present invention.

A scaleplate according to an embodiment of the present invention may be used as a gauge for tidal and/or water level measurement. As shown in FIGS. 8A and 8B, a tidal/water level measurement system 800 includes a scaleplate 810 mounted to a dam or shore structure 802. Scaleplate 810 is partially merged under water level 84. A measurement system 850 is set up to focus at a measurement position 84a at which scaleplate 810 and water level 84 intersect, as depicted by dotted line in FIG. 8B. An image of marking elements 822 at measurement position 84a can be captured by measurement system 850. Based on the scaleplate coding scheme illustrated above, a unit value of a marking unit at which measurement position line 84a passes, can be obtained. Locating the unit value in a comparison table pre-stored in measurement system 850, the actual water level data can be obtained.

The above-mentioned optical image may be captured at a first instant, and the water level determined are recorded by measurement system 850 corresponds to the first instant. After a predetermined time interval, e.g. at a second instant, a second optical image may be captured at a position where the new water level 84b intersects with scaleplate 810, and a further water level data can be determined. By comparing the water level data obtained at the two instant, a variation of water level can be determined, with respect to the first and second instant. This process may be repeated at further instants to obtain a series of water level data by which, a time-based measurement and/or real-time monitoring of water level/tidal status can be achieved.

Application Example 3

Figures 9A, 9B:
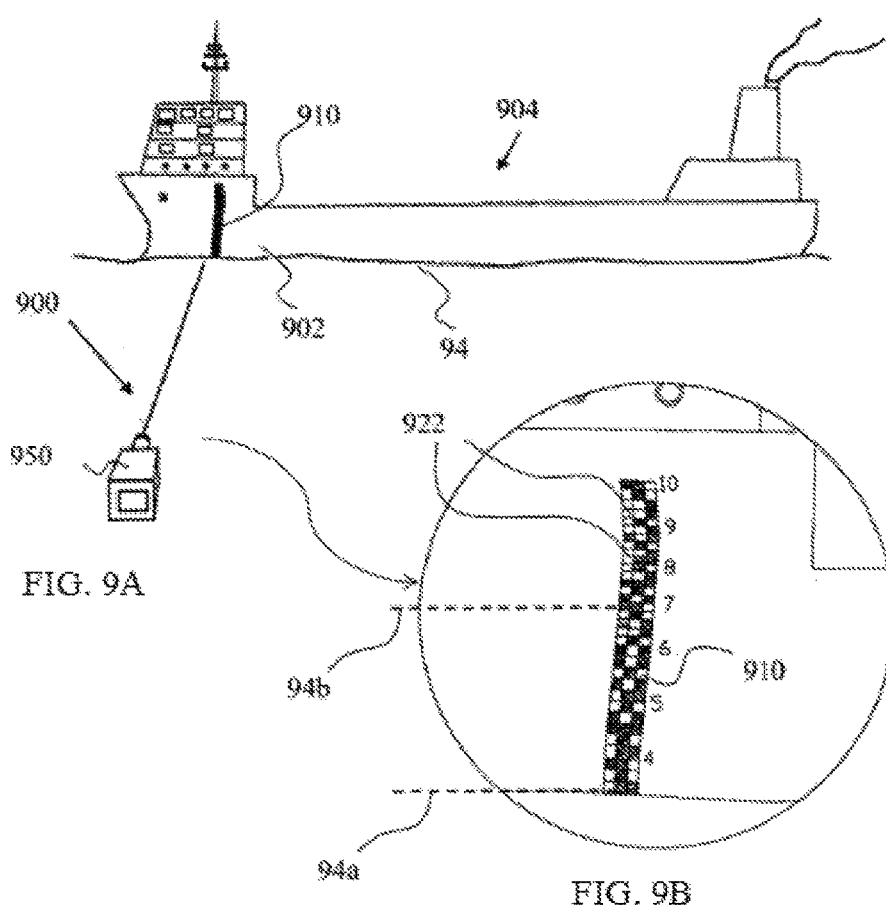
FIG. 9A is a diagram showing an optical measurement system using a scaleplate according to yet another application example of the present invention.
FIG. 9B is a partial enlarged view of FIG. 9A.

A scaleplate according to an embodiment of the present invention maybe used in an automatic ship draft reading system. As shown in FIG. 9, in an automatic ship draft reading system 900, a scaleplate 910 is mounted on an external surface of a hull 902 of a ship 904. Scaleplate 910 is partially merged under water level 94. A measurement system 950 is set up to focus at a measurement position at which scaleplate 910 and water level 94 intersect, as depicted by dotted line 94a in FIG. 9B. An image of marking elements 922 at measurement position 94a can be captured by measurement system 950. Based on the scaleplate coding scheme illustrated above, a unit value of a marking unit at which measurement position line 94a passes, can be obtained. Locating the unit value in a comparison table pre-stored in measurement system 950, the actual ship position with respect to water level 94 can be obtained.

Similar to Application example 2 illustrated above, at a subsequent instant, a second image can be captured to measure another actual ship position, e.g. that depicted by reference sign 94b in FIG. 9B. Time-based and/or real-time monitoring of actual ship position can be achieved by analysing the different ship position data and the time lapsed between the first and second instant.

Application Example 4

Figures 10A, 10B:
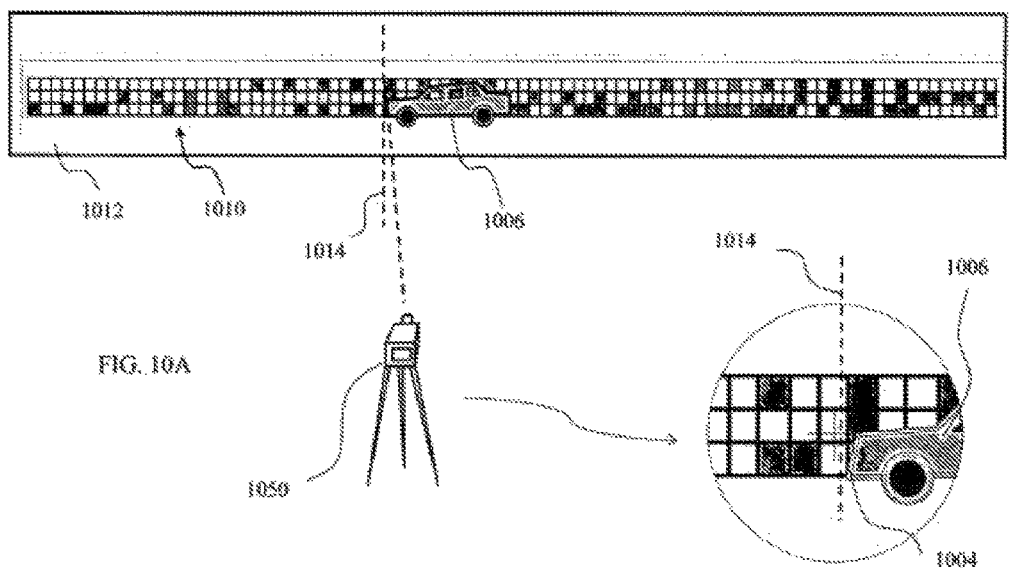
FIG. 10A is a diagram showing an optical measurement system using a scaleplate according to still another application example of the present invention.
FIG. 10B is a partial enlarged view of FIG. 10A.

A scaleplate disclosed in the present invention may be used to measure the velocity of a moving body e.g. in a vehicle testing system. A shown in FIG. 10, in a vehicle testing system 1000, a scaleplate 1010 is mounted on a background structure, e.g. a wall 1012, with marking units horizontally arranged. It is also possible that the marking units are directly painted on wall 1012 and in this situation, wall 1012 acts as the substrate of scale plate 1010. A measurement system 1050 is set up to focus at a measurement position, e.g. a front edge 1004 of a car 1006. A sighting line from measurement system 1050 to the front edge 1004 of car 1006 extends further and is collimated at a measurement line 1014 of scaleplate 1010.

At a first instant, a first image of marking elements on scaleplate 1010, at which measurement line 1014 is in alignment with front edge 1004 of car 1006, is captured. Based on the scaleplate coding scheme illustrated above, a unit value of a marking unit at which measurement line 1014 passes, can be obtained. Locating the unit value in a comparison table pre-stored in measurement system 1050, the actual position of front edge 1004 of car 1006, at the first instant, can be obtained.

The above process may be repeated at a second instant, by following the movement of car 1006, and the actual position of front edge 1004 of car 1006 at the second instant, can be obtained. The velocity of the car can then be determined based on the position data measured and first and second instants recorded.

Application Example 5

In a further application example as shown in FIGS. 10C, 10D, 10E and 10F, a visual gaming system 1060 includes a display panel 1061 on which a visual image e.g. a moving target 1064 is displayed. Display panel 1061 may be an LED TV or monitor which displays target 1064 and other visual contents according to relevant technology, or a screen on which target 1064 is generated from a video projector (not shown). Superimposed to display panel 1061 there is a scaleplate 1066, e.g. one shown in FIG. 6A. A light beam gun 1070 is coupled to display surface 1061 and scaleplate 1066, via cable 1072 or wireless means 1076, to a game console 1074.

Light beam gun 1070 includes a collimating system 1070a and a scaleplate reader 1070b aligned to collimating system 1070a. In a shooting simulation game, collimating system 1070a allows a player to aim at target 1064 and at the same time, scaleplate reader 1070b captures the marking elements on scaleplate 1066 at which target 1064 is positioned. The image of target 1064 and image of scaleplate 1066 image may be separated, e.g. the target image is only viewable by the player while scaleplate 1066 is only detectable by the scaleplate reader 1070b, so that the player can have an experience of target viewing, aiming and shooting in a manner the same as that in a normal video shooting game.

During the game, when light beam gun 1070 is aimed at target 1064, an optional light beam 1701 is directed to target 1064, prompting to the player that target 1064 is aimed. Meanwhile, scaleplate reader 1070b is adjusted to capture a portion of scaleplate 1066 at which target 1064 is positioned. The field of view may be adjusted to suit the size of the screen and the distance between light beam gun 1070 and display panel 1061 so as to capture appropriate number of marking units and also maintain accurate coordinate reading. The position corresponding to target 1064, e.g. the coordinate values 1064$x$ and 1064$y$ of target 1064, with respect to a reference point 1062, can be determined in a method illustrated according to the sixth embodiment in conjunction with FIGS. 6A to 6M i.e. a scale plate for 2-dimensional position measurement. Determination of the position can be done by light beam gun 1070 or by game console 1074. In the former case, only coordinate of the "aimed point" will be transmitted to game console 1074. In the later case, images of marking elements on the scaleplate are captured by light beam gun 1070 and are transmitted to and processed by game console 1074. In both cases, game console 1074 will determine and track the position at which the light beam gun 1070 is pointed, in a continuous manner. When the player pulls the trigger, the game console 1074 will receive this signal and determine whether the light beam gun 1070 is pointed at the target 1064 at that moment, and give results.

To achieve image separation, the target image and the scaleplate image may be polarized into different directions and are displayed on display panel 1061 simultaneously. The player is provided with an eyewear configured for viewing images of one polarization direction, i.e. to view the target only, through collimating system 1070a. Scaleplate reader 1070b in light beam gun 1070 is provided with a polarization filter in another polarization direction to capture the scaleplate image.

The game image and scaleplate image may also be alternately displayed with rapid succession. The player is provided with an eyewear that synchronizes with the game image such that the player only sees the game image and the shooting target. In the meantime, scaleplate reader 1070b in light beam gun 1070 is synchronized to only receive the scaleplate image for position measurement.

By proper configuration of the display characteristics of the game image and scaleplate image, it is also possible that the above-illustrated visual gaming system works without the need for a player to use eyewear. The scaleplate image may be dimmed to a lower brightness level compared to the game image, such that the player will hardly notice the existence of the scaleplate. Scaleplate reader 1070b in light beam gun 1070, on the other hand, is capable of detecting the scaleplate and capture the scaleplate image, to determine the position/coordinates.

A visual gaming system illustrated above has several distinct advantages over conventional visual gaming systems. Firstly, it is not limited to the type of display screen and solves the problem of the traditional light beam gun which only works with CRT monitors. Integrating a scaleplate into a display panel, embodiments of the present invention provides solutions to enable visual shooting game using a wide range of display screens, e.g. modern LCD, LED monitors, TVs or projector screens. Secondly, the aiming and positioning accuracy will be largely increased as this system and method detect target positions at which the light gun is directly pointed. Thirdly, the aiming process is continuously monitored and the track of the aimed point can be recorded by the system and used for review, so the player can learn from the previous practices and improve shooting skills.

Figure 11:
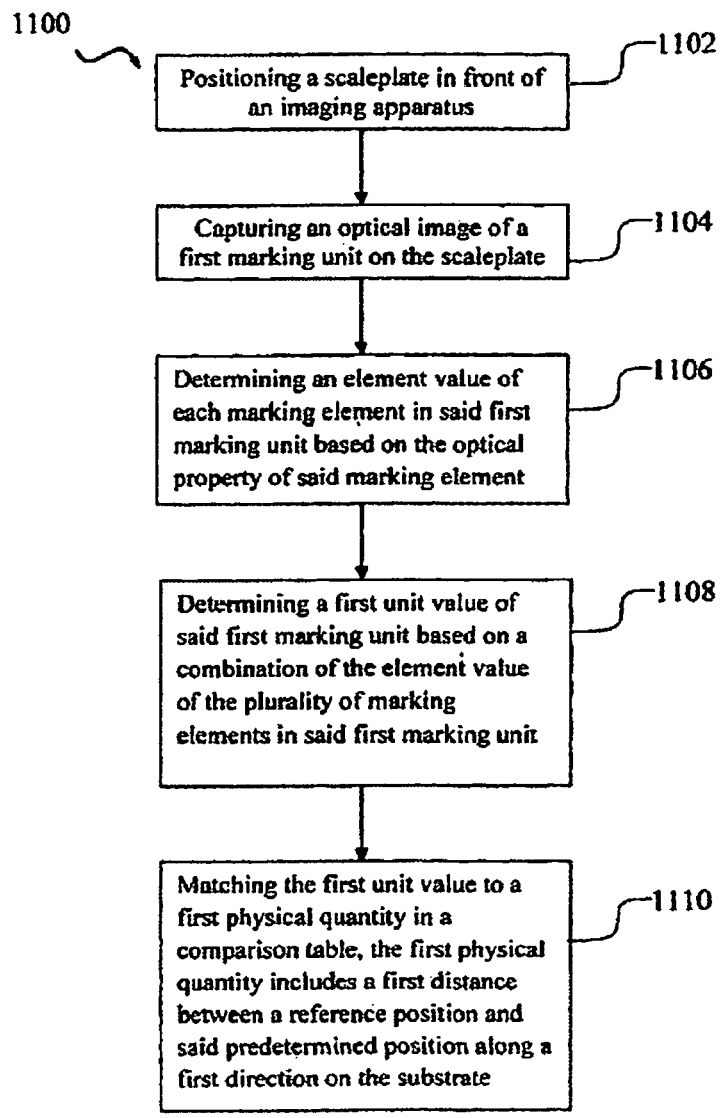
FIG. 11 is a flow chart showing an optical measurement method according to an embodiment of the present invention.

FIG. 11 is a flowchart showing an optical measurement method 1100 according to an embodiment of the present invention. At block 1102, a scaleplate is positioned in front of an imaging apparatus. At block 1104, an optical image of a first marking unit on the scaleplate is captured by the imaging apparatus. At block 1106, an element value of each marking element in the marking unit is determined based on an optical property of said marking element. At block 1108, a first unit value of the first marking unit based on a combination of the element value of the plurality of marking elements in said first marking unit is determined. At block 1110, the first unit value is matched to a first physical quantity in a comparison table. The first physical quantity includes a first distance between a reference position and said predetermined position along a first direction on the substrate.

Although embodiments of the present invention have been illustrated in conjunction with the accompanying drawings and described in the foregoing detailed description, it should be appreciated that the present invention is not limited to the embodiments disclosed. Therefore, the present invention should be understood to be capable of numerous rearrangements, modifications, alternatives and substitutions without departing from the spirit of the invention as set forth and recited by the following claims.

The invention claimed is:

1. An optical measurement scaleplate comprising:
   a substrate defining a first direction thereon;
   a plurality of marking units each being borne on the substrate at a predetermined position, each marking unit including a plurality of optically detectable marking elements, each of said marking elements having an element value defined by an optical property thereof,
   wherein each marking unit has a unit value determined by a permutation of the element value of each of the marking elements in said marking unit, each unit value corresponding to a physical quantity,
   wherein the physical quantity includes a first distance between a reference position and said predetermined position along the first direction;
   wherein the substrate defines a second direction across the first direction, wherein at least two marking elements in each marking unit are arranged in a first alignment row parallel to the second direction;
   wherein each marking unit further includes at least two marking elements arranged in a second alignment row along the second direction and spaced apart from the first alignment row.

2. The optical measurement scaleplate of claim 1, wherein every two adjacent marking units are partially overlapped along the first direction by at least one marking element.

3. The optical measurement scaleplate of claim 2, wherein each subsequent marking unit is offset along the first direction by one marking element with respect to an antecedent marking unit adjacent to said subsequent marking unit.

4. The optical measurement scaleplate of claim 3, wherein the substrate has a flat surface, the first and second directions are linear directions perpendicular to each other on the flat surface, the first distance is a linear distance along the first direction between the reference position and the first alignment row.

5. The optical measurement scaleplate of claim 3, wherein the substrate has a flat surface, the first direction is a circumferential direction and the second direction is a radial direction on the flat surface, the first distance is an angular distance along the circumferential direction between the reference position and the first alignment row.

6. The optical measurement scaleplate of claim 3, wherein the substrate has a revolving surface, the first direction is a circumferential direction and the second direction is an axial direction of the revolving surface, the first distance is an angular distance along the circumferential direction between the reference position and the first alignment row.

7. An optical measurement scaleplate comprising:
   a substrate defining a first direction thereon;
   a plurality of marking units each being borne on the substrate at a predetermined position, each marking unit including a plurality of optically detectable marking elements, each of said marking elements having an element value defined by an optical property thereof,
   wherein each marking unit has a unit value determined by a permutation of the element value of each of the marking elements in said marking unit, each unit value corresponding to a physical quantity,
   wherein the physical quantity includes a first distance between a reference position and said predetermined position along the first direction;
   wherein the substrate defines a second direction across the first direction, wherein at least two marking elements in each marking unit are arranged in a first alignment row parallel to the second direction;
   wherein the marking units are arranged in a 2-dimensional matrix along the first and second directions, wherein the physical quantity further includes a second distance between the reference position and said predetermined position along the second direction.

8. The optical measurement scaleplate of claim 7, wherein every two adjacent marking units along the first direction are partially overlapped by at least one marking element, and every two adjacent marking units along the second direction are partially overlapped by at least one marking element.

9. The optical measurement scaleplate of claim 8, wherein each subsequent marking unit is offset by one marking element with respect to an antecedent marking unit adjacent to said subsequent marking unit along the first direction, and each subsequent marking unit is offset by one marking element with respect to an antecedent marking unit adjacent to said subsequent marking unit along the second direction.

10. The optical measurement scaleplate of claim 9, wherein the substrate has a flat surface, the first and second directions are linear directions perpendicular to each other on the flat surface, the first distance is a linear distance along the first direction between the reference position and the first alignment row.

11. The optical measurement scaleplate of claim 9, wherein the substrate has a revolving surface, the first direction is a circumferential direction and the second direction is an axial direction of the revolving surface, the first distance is an angular distance along the circumferential direction between the reference position and the first alignment row.

12. The optical measurement scaleplate of claim 1, wherein each marking element is a passive light reflector borne on the substrate and wherein the optical property is one of a colour, shape, greyscale, brightness, pattern or a combination thereof.

13. The optical measurement scaleplate of claim 12, wherein each marking element is an optical image provided from a projector and the substrate is a projector screen bearing the optical image of each of the plurality of marking elements.

14. The optical measurement scaleplate of claim 1, wherein each marking element is a light source fixed on the substrate and wherein the optical property is one of a colour, brightness, illumination level or a combination thereof.

15. The optical measurement scaleplate of claim 14, wherein each marking element is an active light emitter fixed on the substrate to form a display screen from which the marking elements emit optical signals.

16. An optical measurement method comprising:
positioning a scaleplate recited in claim 1 in front of an imaging apparatus;
capturing an optical image of a first marking unit on the scaleplate;
determining an element value of each marking element in said first marking unit based on the optical property of said marking element;
determining a first unit value of said first marking unit based on a permutation of the element value of the plurality of marking elements in said first marking unit;
matching the first unit value to a first physical quantity in a comparison table;
wherein the first physical quantity includes a first distance between the reference position and said predetermined position along the first direction on the substrate.

17. The method of claim 16, wherein the first physical quantity includes a second distance between the reference position and said predetermined position along a second direction on the substrate perpendicular to the first direction.

18. The method of claim 16, wherein the optical image of the first marking unit is captured at a first instant, the method further comprising:
capturing an optical image of a second marking unit at a second instant;
determining an element value of each marking element in said second marking unit based on the optical property of said each marking element;
determining a second unit value of said second marking unit based on a permutation of the element value of the plurality of marking elements in said second marking unit;
matching the second unit value to a second physical quantity in a comparison table, and
determining a movement status of the scaleplate based on the first physical quantity, the second physical quantity, the first instant and the second instant.

19. The method of claim 16 further comprising:
defining a measurement line passing through the first marking unit;
determining a relative position of the measurement line between an upper border and a lower border of the first marking unit,
determining a ratio value based on the relative position, wherein the first physical quantity includes the first distance and the ratio value.

20. An optical measurement system comprising:
a scaleplate as recited in claim 1;
an imaging apparatus including:
an optical signal receiver for capturing an optical image of the scaleplate;
a processor coupled to the optical signal receiver for receiving the optical image, wherein the processor is to determine the element value of each marking element in the optical image based on the optical property thereof to determine the unit value based on a permutation of the element values, and
a comparison table matching the unit value to a corresponding physical quantity,
wherein the physical quantity includes a first distance between the reference position and said predetermined position along the first direction.

21. The optical measurement system of claim 20, wherein the substrate further defining a second direction across the first direction, wherein the physical quantity includes a second distance between the reference position and said predetermined position along the second direction.

22. The optical measurement system of claim 20, wherein each marking element is a light source, the optical property is one of a colour, brightness, illumination level or a combination thereof, and wherein the system further comprising a controller for independently controlling a lighting status of each marking element.

23. The optical measurement system of claim 20, further comprising a screen superimposed to the scaleplate to display a visual image thereon, and a collimating system for directing a light beam onto the visual image to aim at the visual image.

24. The optical measurement system of claim 23, wherein the optical measurement scaleplate has a brightness lower than that of the visual image.

25. The optical measurement scaleplate of claim 7, wherein each marking element is a passive light reflector borne on the substrate and wherein the optical property is one of a colour, shape, greyscale, brightness, pattern or a combination thereof.

26. The optical measurement scaleplate of claim 25, wherein each marking element is an optical image provided from a projector and the substrate is a projector screen bearing the optical image of each of the plurality of marking elements.

27. The optical measurement scaleplate of claim 7, wherein each marking element is a light source fixed on the substrate and wherein the optical property is one of a colour, brightness, illumination level or a combination thereof.

28. The optical measurement scaleplate of claim 27, wherein each marking element is an active light emitter fixed on the substrate to form a display screen from which the marking elements emit optical signals.

29. An optical measurement method comprising:
positioning a scaleplate recited in claim 7 in front of an imaging apparatus;
capturing an optical image of a first marking unit on the scaleplate;
determining an element value of each marking element in said first marking unit based on the optical property of said marking element;
determining a first unit value of said first marking unit based on a permutation of the element value of the plurality of marking elements in said first marking unit;
matching the first unit value to a first physical quantity in a comparison table;
wherein the first physical quantity includes a first distance between the reference position and said predetermined position along the first direction on the substrate.

30. The method of claim 29, wherein the first physical quantity includes a second distance between the reference position and said predetermined position along a second direction on the substrate perpendicular to the first direction.

31. The method of claim 29, wherein the optical image of the first marking unit is captured at a first instant, the method further comprising:
capturing an optical image of a second marking unit at a second instant;
determining an element value of each marking element in said second marking unit based on the optical property of said each marking element;
determining a second unit value of said second marking unit based on a permutation of the element value of the plurality of marking elements in said second marking unit;
matching the second unit value to a second physical quantity in a comparison table, and
determining a movement status of the scaleplate based on the first physical quantity, the second physical quantity, the first instant and the second instant.

32. The method of claim 29 further comprising:
defining a measurement line passing through the first marking unit;
determining a relative position of the measurement line between an upper border and a lower border of the first marking unit,
determining a ratio value based on the relative position, wherein the first physical quantity includes the first distance and the ratio value.

33. An optical measurement system comprising:
a scaleplate as recited in claim 7;
an imaging apparatus including:
an optical signal receiver for capturing an optical image of the scaleplate;
a processor coupled to the optical signal receiver for receiving the optical image, wherein the processor is to determine the element value of each marking element in the optical image based on the optical property thereof to determine the unit value based on a permutation of the element values, and
a comparison table matching the unit value to a corresponding physical quantity,
wherein the physical quantity includes a first distance between the reference position and said predetermined position along the first direction.

34. The optical measurement system of claim 33, wherein the substrate further defining a second direction across the first direction, wherein the physical quantity includes a second distance between the reference position and said predetermined position along the second direction.

35. The optical measurement system of claim 33, wherein each marking element is a light source, the optical property is one of a colour, brightness, illumination level or a combination thereof, and wherein the system further comprising a controller for independently controlling a lighting status of each marking element.

36. The optical measurement system of claim 33, further comprising a screen superimposed to the scaleplate to display a visual image thereon, and a collimating system for directing a light beam onto the visual image to aim at the visual image.

37. The optical measurement system of claim 36, wherein the optical measurement scaleplate has a brightness lower than that of the visual image.

* * * * *